(12) United States Patent
Seshadri et al.

(10) Patent No.: US 10,631,248 B2
(45) Date of Patent: Apr. 21, 2020

(54) MID-CYCLE ADJUSTMENT OF INTERNAL CLOCK SIGNAL TIMING

(71) Applicant: Texas Instruments Incorporated, Dallas, TX (US)

(72) Inventors: Anand Seshadri, Richardson, TX (US); Hugh P McAdams, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 527 days.

(21) Appl. No.: 15/607,881

(22) Filed: May 30, 2017

(65) Prior Publication Data

US 2018/0352509 A1 Dec. 6, 2018

(51) Int. Cl.
| | |
|---|---|
| *G01D 18/00* | (2006.01) |
| *H04W 52/02* | (2009.01) |
| *G06F 11/30* | (2006.01) |
| *G06F 9/30* | (2018.01) |
| *G06F 1/04* | (2006.01) |
| *G06F 1/12* | (2006.01) |

(52) U.S. Cl.
CPC ............ *H04W 52/029* (2013.01); *G06F 1/04* (2013.01); *G06F 1/12* (2013.01); *G06F 9/30021* (2013.01); *G06F 11/3024* (2013.01); *G06F 11/3058* (2013.01)

(58) Field of Classification Search
None
See application file for complete search history.

(56) References Cited

U.S. PATENT DOCUMENTS

| | | | |
|---|---|---|---|
| 5,956,289 A | 9/1999 | Norman et al. | |
| 6,748,565 B1 * | 6/2004 | Holmes | H04L 7/0008 714/700 |
| 9,350,336 B2 | 5/2016 | McAdams | |
| 2004/0078510 A1 | 4/2004 | Spriggs et al. | |
| 2010/0074035 A1 | 3/2010 | Do | |
| 2015/0222282 A1 | 8/2015 | McAdams | |

\* cited by examiner

*Primary Examiner* — Aditya S Bhat
(74) *Attorney, Agent, or Firm* — Rose Alyssa Keagy; Charles A. Brill; Frank D. Cimino

(57) ABSTRACT

Changes in operating conditions, like voltage or temperature, can cause the frequency of an internal clock signal to change and negatively affect device operation. In one embodiment, a method for controlling internal clock frequency of a device includes counting a number of clock cycles of the internal clock signal relative to a current period of a system clock signal to determine a current mid-cycle count of clock cycles, wherein the internal clock signal is based on a first clock signal of a plurality of clock signals produced in the device, each having a different frequency. When the current mid-cycle count is differs from a calibrated mid-cycle count by more than a tolerable amount, a second clock signal of the plurality of clock signals is selected as the internal clock signal.

25 Claims, 9 Drawing Sheets

MID-CYCLE ADJUSTMENT OF INTERNAL CLOCK SIGNAL TIMING

BACKGROUND

This section is intended to introduce the reader to various aspects of art that may be related to the subject matter described and/or claimed below, and is believed to be helpful in providing the reader with background information to facilitate a better understanding of the present disclosure. It should be understood that these statements are to be read in this light, not as admissions of prior art.

The present disclosure relates generally to integrated circuit architecture and, more specifically, to the generation of internal clock signals in integrated circuit devices.

Advances in semiconductor technology in recent years have reduced the minimum feature sizes of semiconductor devices in integrated circuits. These advances have led to increases in functionality of large-scale integrated circuits for a given chip area. For example, a single modern integrated circuit can now contain over a billion transistors, and can carry out multiple complex functions. In addition, these reductions in device feature sizes, such as metal-oxide-semiconductor (MOS) transistor gates, also serve to increase the switching speed of those devices and the overall performance of the integrated circuit.

Internal operations in such large scale integrated circuits, particularly those involving digital logic, are typically clocked. Some integrated circuits receive an external timing reference, such as a crystal oscillator or an externally generated clock signal, from which other internal clock signals can be derived. Internal functions within the integrated circuit, such as those functions that are carried out within an external clock, are typically based on such internally-generated clock signals. For instance, internal clock signals may be used for input and output operations where synchronization with the external clock is beneficial. Examples of conventional internal clock generator circuits include oscillators, frequency synthesizers, and the like, along with associated frequency divider or clock multiplier functions. Examples of internal functions controlled by such internal clock signals include the timing of signals involved in accessing selected memory cells in a memory array in the integrated circuit. Different memory technologies (e.g., static random access memory (SRAM), non-volatile memory, read-only memory (ROM), dynamic RAM (DRAM), etc.) may be implemented in the same large scale integrated circuit and may require control signals with different timings.

As is known in the art, the electrical behavior of solid-state components, such as MOS transistors, can vary depending on certain parameters. Variations in the fabrication process, for example variations in MOS transistor gate width or threshold voltage, will be reflected in the electrical performance of transistors and other components. The operating conditions of the integrated circuit, including the power supply voltage and the operating temperature, also result in variations in electrical performance. Thus, the switching speed of transistors in an integrated circuit can vary with variations in fabrication process parameters, power supply voltage, and operating temperature (sometimes referred to as "PVT" variations).

For integrated circuits in which internal functions are clocked by internal clock signals, these variations in device performance can affect both internal clock generator circuits and the circuits controlled by those clock generator circuits. For instance, it has been observed that internal timing may vary, due to these causes, by as much as 100% between the fastest "corner" of the process, voltage, and temperature (i.e., the combination of process parameters, power supply voltage, and operating temperature meeting specification limits that results in the fastest transistor switching speed) and the slowest "corner". While these PVT variations are important factors to consider in the design of an integrated circuit, the matching of device sizes and attributes in modern complementary MOS (CMOS) integrated circuits generally allow the various circuit functions within the same device to "track" one another over these variations in process, voltage, and temperature. In other words, the various delay and switching times within the same integrated circuit tend to track one another over variations in process, temperature, and voltage. This tracking among devices in the same integrated circuit provides robustness in the overall integrated circuit operation over these variations.

Ferroelectric memory is a type of non-volatile memory technology based on capacitors in which the dielectric material is a polarizable ferroelectric material, such as lead zirconate titanate (PZT) or strontium-bismuth-tantalate (SBT). Hysteresis in the charge-versus-voltage (Q-V) characteristic, based on the polarization state of the ferroelectric material, enables the non-volatile storage of binary states in these capacitors after voltage has been removed from the capacitor plates, with the stored state corresponding to the polarization state of the ferroelectric material. It has been observed that ferroelectric capacitors can be constructed by processes that are largely compatible with modern CMOS integrated circuits, for example by placing capacitors above the transistor level between overlying levels of metal conductors. Accordingly, ferroelectric memory technology is now commonly used as a non-volatile solid state read/write random access memory in many electronic systems, particularly portable electronic devices and systems, and is commonly referred to as ferroelectric RAM or FRAM.

Various memory cell architectures including ferroelectric capacitors are known in the art, including a 1T-1C (one transistor, one capacitor) arrangement that is similar to conventional DRAM memory cells, 2T-2C (two transistor, two capacitor) cells in which the two ferroelectric capacitors in a cell are polarized to complementary states, and even larger cells, such as 6T FRAM cells. The state of a ferroelectric memory cell is read by interrogating the capacitance of the ferroelectric capacitors to discern its polarization state, specifically by detecting the polarization capacitance (i.e., charge storage) that occurs a voltage above a coercive voltage is applied. When the memory state is opposite that of the applied voltage, that voltage will cause the capacitor to change its polarization state, which appears as a relatively high capacitance. But when the memory state matches that of the applied voltage, that voltage exhibits little capacitance due to polarization since its ferroelectric domains are already aligned in the direction of the applied coercive voltage, causing little additional polarization charge to be stored.

Unfortunately, it has been observed that the switching behavior of ferroelectric capacitor does not necessarily track that of conventional CMOS devices over variations in process, voltage, and temperature. For example, at low temperatures (e.g., −40° C.), it has been observed that the polarization charge of a ferroelectric capacitor is reduced because the coercive voltage of the ferroelectric material increases with decreasing temperature, which weakens the stored state. In addition, the time required to "extract" the polarization charge (i.e., read the memory state of the ferroelectric capacitor) increases with decreasing temperature. In other words, low temperature operation of ferroelectric memory results in a read signal that is both weaker and slower, as additional time is necessary to develop a data signal for detection by sense amplifiers in the memory. In contrast, lower temperatures tend to decrease switching times and propagation delays in CMOS circuits, including internal clock generators, sense amplifiers, and the like, which can actually result in faster and improved operation. One approach in addressing this mismatch between the faster operation of CMOS circuits and the slower response by the ferroelectric cells is to design additional delay in the sense operation to ensure functionality at cold operating temperature. However, this additional delay may further slow memory operation at higher temperatures, particularly at the high temperature corner at which CMOS circuits are already near their slowest, which can undesirably push out access and cycle times of the memory.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Disclosed embodiments provide a device and method of operating the same that provide compensation in internal clock generation for variations in process, voltage, and temperature. Disclosed embodiments further provide such a device and method that improves the operation of circuit functions involving technologies with non-tracking behavior over such variations, such as ferroelectric memory devices and CMOS logic and clock circuits. Disclosed embodiments further provide a device and method in which such compensation is provided without reducing memory availability.

According to certain embodiments, a method for controlling an internal clock signal used in operation of a device includes counting a number of clock cycles of the internal clock signal relative to a current period of a system clock signal to determine a current mid-cycle count of the internal clock signal, wherein the internal clock signal is based on a first clock signal of a plurality of clock signals generated in the device. Each of the plurality of clock signals has a different frequency. The current mid-cycle count is compared to a calibrated mid-cycle count. When the comparison indicates that the current mid-cycle count is less than the calibrated mid-cycle count by at least a first number of clock cycles, a second clock signal of the plurality of clock signals, which is the next fastest of the plurality of clock signals relative to the first clock signal, is selected as the internal clock signal.

In one embodiment, when the comparison indicates that the current mid-cycle count is greater than the calibrated mid-cycle count, a determination is made as to whether the current mid-cycle count represents at least a certain percentage of a second number of clock cycles. If so, a third clock signal of the plurality of clock signals, which is the next slowest one of the plurality of clock signals relative to the first clock signal, is selected as the internal clock signal.

In one embodiment, the device may be a memory device, such as a ferroelectric memory device, and the second number of clock cycles represents a number of clock cycles within a period of the system clock signal that allows for completion of a memory access operation within a maximum memory cycle time constraint of the memory device.

Various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure are described below. These embodiments are only examples of the presently disclosed techniques. In an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and/or business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than those listed. The embodiments discussed below are intended to be illustrative examples and should not be construed to mean that they are necessarily preferential in nature. Additionally, it should be understood that references to "one embodiment" or "an embodiment" within the present disclosure are not to be interpreted as excluding the existence of additional embodiments that also incorporate the recited features.

Figure 1:
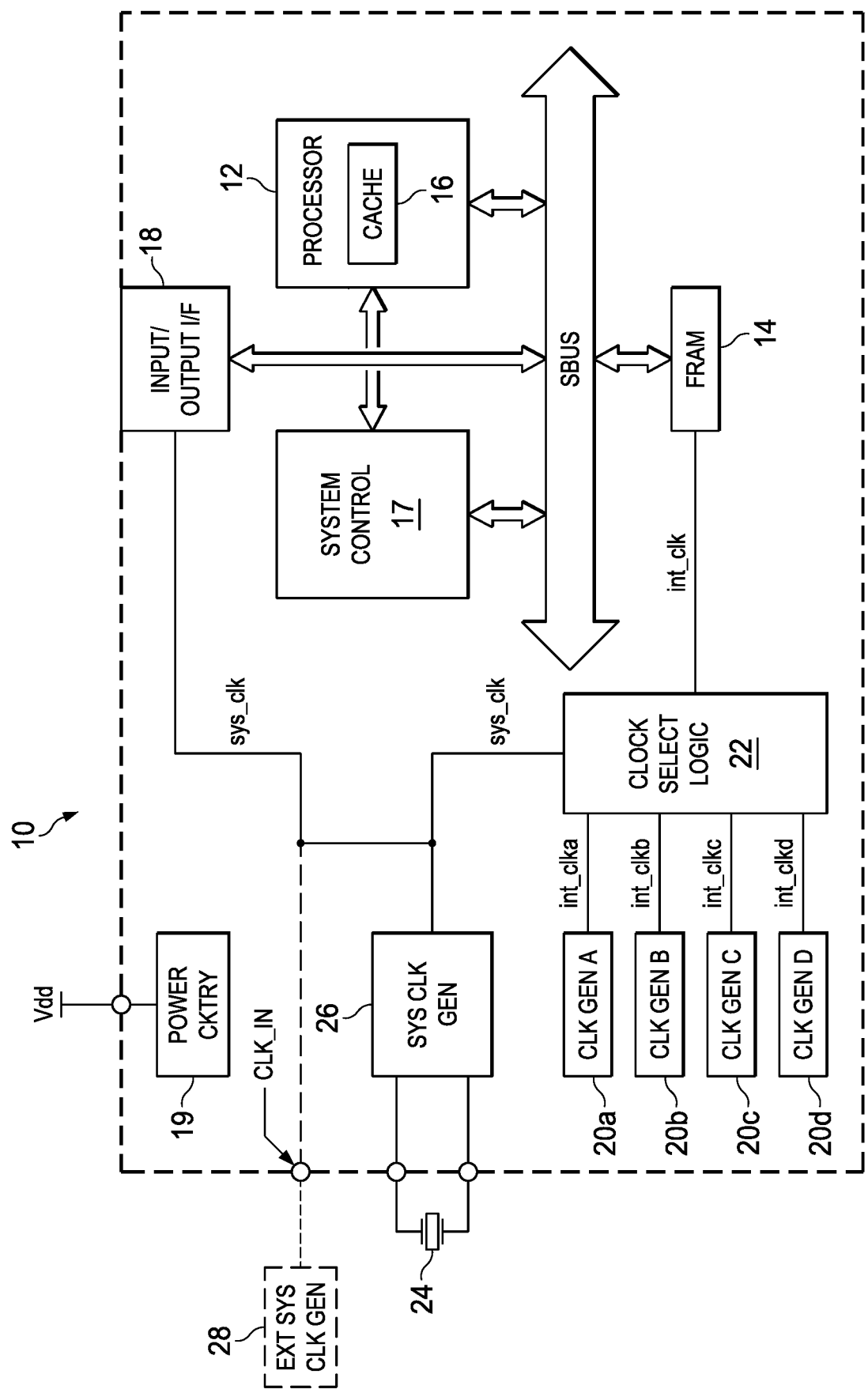
FIG. 1 is a functional block diagram of an electronic device that includes clock select logic for producing an internal clock signal in accordance with one embodiment.

FIG. 1 is a functional block diagram depicting an electronic device 10, in accordance with an embodiment. Device 10 includes a processor 12, which is connected to a system bus SBUS. Device 10 includes memory resources, such as memory 14, that reside on SBUS and is thus accessible to processor 12. In this depicted embodiment, memory 14 includes a ferroelectric random access memory (FRAM) and may serve as data memory as well as program memory so as to store program instructions executable by processor 12.

Other memory resources may additionally or alternatively be implemented in electronic device 10. For example, device 10 may include other memories residing on SBUS instead of or in addition to FRAM 14, including volatile memory such as SRAM or DRAM and/or non-volatile memory such as electrically erasable programmable read-only memory (EEPROM). Device 10 may also include cache memory 16, such as L1, L2, and L3 caches, which may be realized by SRAM and reside in processor 12. Other system functions are shown, in a generic sense, in the device 10 by way of system control 17, input/output interface 18, and power circuitry 19.

Processor 12 controls the general operation of electronic device 10. For instance, processor 12 may provide the processing capability to execute an operating system, programs, user and application interfaces, and any other functions of device 10. Processor 12 may include a general-purpose or application-specific (ASIC) processor, field-programmable gate array (FPGA), graphics processor (GPU), embedded processor, digital signal processor, system-on-chip or "SoC", microcontroller, and/or related chip sets.

Device 10 includes clock circuitry to control the operation of the various component functions. For example, in the depicted embodiment, clock generator circuits 20a, 20b, 20c, 20d are provided. Clock generator circuits 20a, 20b, 20c, 20d may be realized using an oscillator, such as a ring oscillator, RC oscillator, Schmitt trigger oscillator, and the like. In any case, clock generator circuits 20a, 20b, 20c, 20d generate separate internal clock signals int_clka, int_clkb, int_clkc, int_clkd, respectively, all of which are applied to clock select logic 22. According to these embodiments, internal clock signals int_clka, int_clkb, int_clkc, int_clkd are at different frequencies from one another. Of course, while four clock generator circuits 20a, 20b, 20c, 20d are provided in this example embodiment, other embodiments may include more or fewer such clock generator circuits. Further in the alternative, one or more of clock generator circuits 20a, 20b, 20c, 20d may be constructed as a frequency divider receiving one of the outputs of one of the other clock generator circuits 20a, 20b, 20c, 20d, and generating its own output at some frequency that is divided down from that at its input.

FIG. 1 also depicts an external time reference that is applied to device 10. This external time reference may be in the form of external crystal 24 connected at terminals of device 10, to which a system clock generator 26 is connected and generates a system clock signal "sys_clk" based on the resonant frequency of crystal 24. System clock generator 26 may be implemented in any suitable manner, for example, as an amplifier or logic gate in combination with the appropriate passive components to form a crystal oscillator circuit with crystal 24. Alternatively, device 10 may receive, at a terminal CLK_IN, a system clock signal generated by an external system clock generator 28, in which case system clock sys_clk will correspond to that external clock. In either case, system clock sys_clk may be buffered, or divided (or multiplied) in frequency, from the external time reference. However produced, it is contemplated that system clock sys_clk will typically be as stable, over variations in operating conditions, as that external time reference. System clock sys_clk may be applied to input/output interface 17 as shown in FIG. 1 to synchronize input and output operations with external functions. Moreover, system clock sys_clk may alternatively or additionally be provided to other functions in the device 10.

According to embodiments described below, system clock sys_clk is also applied to clock select logic 22 for use in selecting one of internal clock signals int_clka, int_clkb, int_clkc, int_clkd as an internal clock int_clk. In the example of FIG. 1, the selected internal clock int_clk is applied to FRAM 14 to control its operation. Of course, internal clock int_clk may be applied to control the operation of other functions and/or components within the device 10, such as those coupled to SBUS.

It will be appreciated that device 10 of FIG. 1 may be any type of device having one or more components that use a clock signal for synchronizing operation with one or more internal or external components. For example, device 10 may be a microcontroller unit or embedded processing unit. In one such embodiment, device 10 may be a microcontroller unit (MCU) capable of operating over a wide temperature range with generally low power consumption, and which includes a low power processor, a volatile memory, such as SRAM, non-volatile memory, as well as analog and mixed signal and power management circuitries. Such a device may be suitable for a number of applications in various industries, for example, industrial, medical device, and automotive applications. By way of example only, device 10 may be a model of an embedded processor, a microcontroller unit, a SoC, or a digital signal processor available from Texas Instruments Incorporated of Dallas, Tex. In one embodiment, the device may also be a stand-alone ferroelectric memory device based on FRAM 14, in which case processor 12 and other functions shown in FIG. 1 are not necessarily included.

Further, device 10 may include additional or alternative functions to those shown in FIG. 1, or may have its functions arranged according to a different architecture from that shown. For instance, in other embodiments, electronic device 10 may be a computing device, such as a mobile telephone (including smartphones), digital media player, a desktop, tablet, or notebook computer, a wearable computing device, and so forth. In such embodiments, device 10 may include additional functional blocks not shown in FIG. 1, such as input structures, RF circuitry to communicate with a network and/or with other devices, and/or a display. The various functions of device 10 may be realized and implemented using hardware elements (e.g., circuitry), software elements (e.g., computer instructions stored on a tangible computer-readable medium) or a combination of both hardware and software elements. Thus, the architecture and functionality of device 10 shown in FIG. 1 is provided by way of example, and is not intended to limit the scope of this disclosure.

Figure 2:
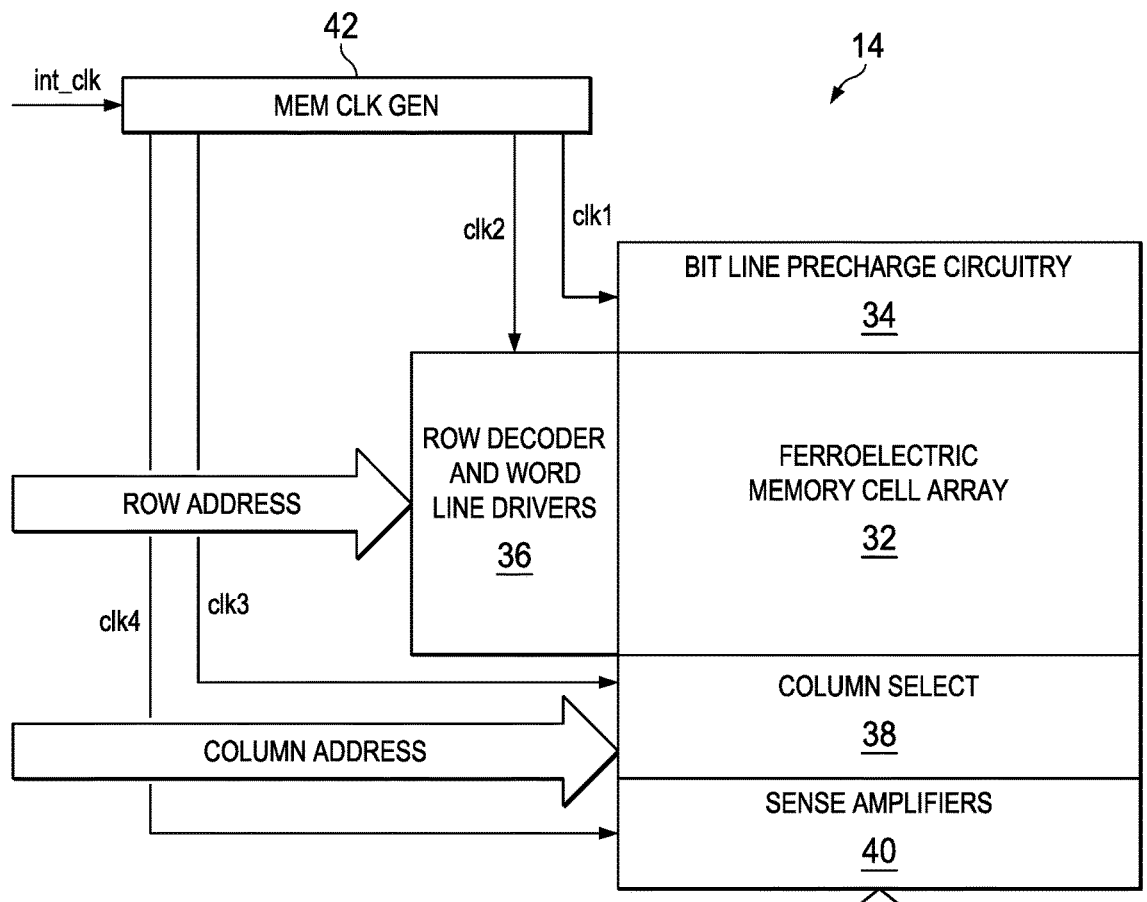
FIG. 2 is a functional block diagram of a memory device that operates based on the internal clock signal produced by the clock select logic of FIG. 1, in accordance with one embodiment.

FIG. 2 illustrates a read path of FRAM 14 in device 10 (or alternatively, as a stand-alone memory circuit as opposed to an embedded memory shown in FIG. 1). Those skilled in the art will recognize that the architecture of FRAM 14 shown in FIG. 2 is provided by way of example only. In this example, FRAM 14 includes a number of ferroelectric memory cells arranged in rows and columns within a memory cell array (FRAM array) 32. While a single instance of FRAM array 32 is shown in FIG. 2, it is understood that FRAM 14 may include multiple FRAM arrays 32, each corresponding to a memory block within an address space of FRAM 14.

FRAM array 32 includes FRAM cells arranged in rows and columns, with cells in the same column sharing one or a pair of bit lines, and with cells in the same row sharing a word line. The FRAM cells in array 32 may be constructed in any one of a number of arrangements, including any of the well-known 1T-1C, 2T-2C, and 6T-2C arrangements. Bit line precharge circuitry 34 is provided to apply a desired precharge voltage to the bit lines in advance of a read operation. Row decoder and word line drivers 36 receive a row address value indicating the row in FRAM array 32 to be accessed and, in response, energize the word line corresponding to that row address value. Column select circuit 38 (also referred to as column decoder circuitry) receives a column address value and, in response, selects corresponding bit lines that are to be placed in communication with sense amplifiers 40. Sense amplifiers 40 may be constructed, for example, as a differential or single-ended amplifier coupled to the bit line or lines for each column selected by column select circuit 38. Sense amplifiers 40 generate a logic level signal in response to the level sensed at corresponding bit lines, and apply that signal in to data bus DATA I/O.

Circuitry (not shown) for programming the states of cells in FRAM array 32 will also typically be provided, as will circuitry (also not shown) for selectively biasing the plates of the ferroelectric capacitors of the cells in FRAM array 32 as appropriate for the read and programming cycles. For purposes of this description of the context of the example embodiments described below, FIG. 2 illustrates the read path side of the architecture of FRAM 14, as the read cycle is typically more timing-critical than the programming operation.

As shown in FIG. 2, the architecture of FRAM 14 also includes a memory clock generator circuit 42, which may be realized as logic circuitry, including one or more counters. Memory clock generator circuit 42 receives internal clock int_clk from clock select logic 22 (FIG. 1) and generates various clock phases clk1, clk2, clk3, clk4, etc., at an appropriate timing relative to one another to control the operation of circuitry in FRAM 14 in the read cycle. For purposes of this description, and as will become apparent from the following description, the period of internal clock int_clk is much shorter than the duration of a single read cycle of FRAM 14. In the example shown in FIG. 2, clock phase clk1 energizes precharge circuitry 34, clock phase clk2 energizes row decoder and word line drivers 36, clock phase clk3 controls column select circuitry 38, and clock phase clk4 energizes sense amplifiers 40.

Since the various functional circuits in FRAM 14 are activated by clock phases clk1, clk2, clk3, clk4 that are produced at certain cycle counts of internal clock int_clk in this embodiment, a successful read of cells addressed by a memory address received by FRAM 14 may depend on the completion of a certain number of cycles "m" of that internal clock int_clk. Thus, a shorter period of internal clock int_clk could thus enable faster memory access and cycle times. However, because of propagation delays in logic circuits, RC delays of the word line and bit lines, read current sourced by the ferroelectric memory cells, and the like, a minimum period "t_int" of internal clock int_clk is usually defined so as to ensure proper operation of FRAM 14 in the read operation. From a design standpoint, a minimum FRAM memory cycle time "t_cyc," which can be expressed as the product of this minimum internal clock period t_int and the number m of internal clock int_clk cycles, is ideally selected to be within a maximum memory cycle time as defined by system specifications.

Figure 3:
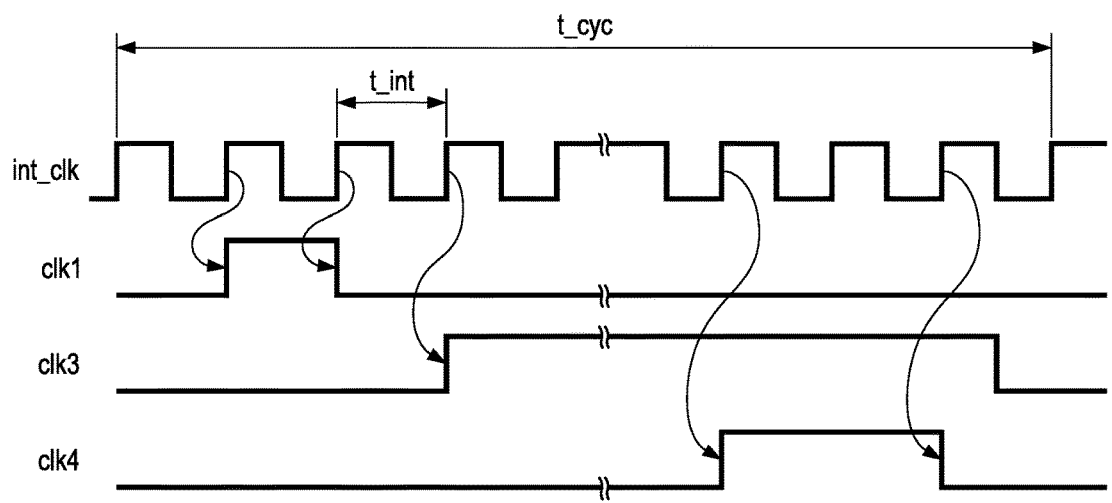
FIG. 3 illustrates representations of clock phases generated based on the internal clock signal and which are used to control various functions of the memory device of FIG. 2.

An example of the relative timing of some of the clock phases clk1 through clk4 generated by memory clock generator circuit 42 within a read cycle of FRAM 14 is shown in FIG. 3. In the timing diagram of FIG. 3, internal clock int_clk is illustrated as a relatively high frequency periodic clock signal, with some number of cycles of internal clock int_clk occurring within a single FRAM read cycle time t_cyc. FIG. 3 also illustrates an example of the timing at which memory clock generator circuit 42 generates the clock phases clk1, clk3, clk4 on the elapse of selected numbers of cycles of internal clock int_clk. In this example, clock phase clk1 is driven active high in response to the leading edge of the second cycle of internal clock int_clk following the start of the memory cycle t_cyc, and driven inactive again by the leading edge of the third cycle of internal clock int_clk. Clock phase clk3 is driven active high by the leading edge of the fourth cycle of internal clock int_clk within the memory cycle t_cyc, and is driven low on the leading edge of the nth cycle of internal clock int_clk. Clock phase clk4 is driven active high for two cycles of internal clock int_clk near the end of the cycle t_cyc. It will further be appreciated that other clock phases used in operation of the FRAM 14 may start and/or end in within an internal clock int_clk cycle t_int. For instance, a clock phase may begin or end at a falling edge of a cycle of internal clock int_clk. As used herein, the term "cycle," when used to describe a clock signal, refers to a period of the clock signal.

As discussed above, variations in fabrication process parameters, power supply voltage, and operating temperature can cause variation in the performance and propagation delay of transistor circuits in modern integrated circuits. For the example of ring oscillators in which the oscillation frequency depends directly on propagation delays in the ring, these process, voltage, and temperature variations can cause corresponding variations in the output frequency of the oscillator. Thus, for circuits such as FRAM 14 in which a certain number of cycles of an internal clock at a minimum internal clock period is relied upon for proper operation, the use of an internal oscillator to generate that internal clock over the applicable process, temperature, and voltage ranges for the integrated circuit can be problematic. This is especially the case in FRAM memories at low temperatures at which the read signal of the ferroelectric memory cell is both weaker and slower while the oscillation frequency of CMOS oscillators is increased.

The present disclosure addresses these difficulties by providing techniques in which internal clock int_clk can be adjusted by switching between the available outputs from multiple clock generator circuits (e.g., 20a, 20b, 20c, 20d) depending on current operating conditions and the particular process parameters of a device, such as FRAM 14, to account for voltage and/or temperature drift during operation, all with the goal of ensuring that, at any given time, the selected internal clock int_clk is able to provide a sufficient number of cycles to allow for the device to complete a given operation. As used herein, the term "adjust," "adjustment," or the like when used with reference to internal clock int_clk is understood to refer to changing of internal clock int_clk from a currently selected one of the available outputs from the multiple clock generator circuits to another one of the available outputs from the multiple clock generator circuits.

Figure 4:
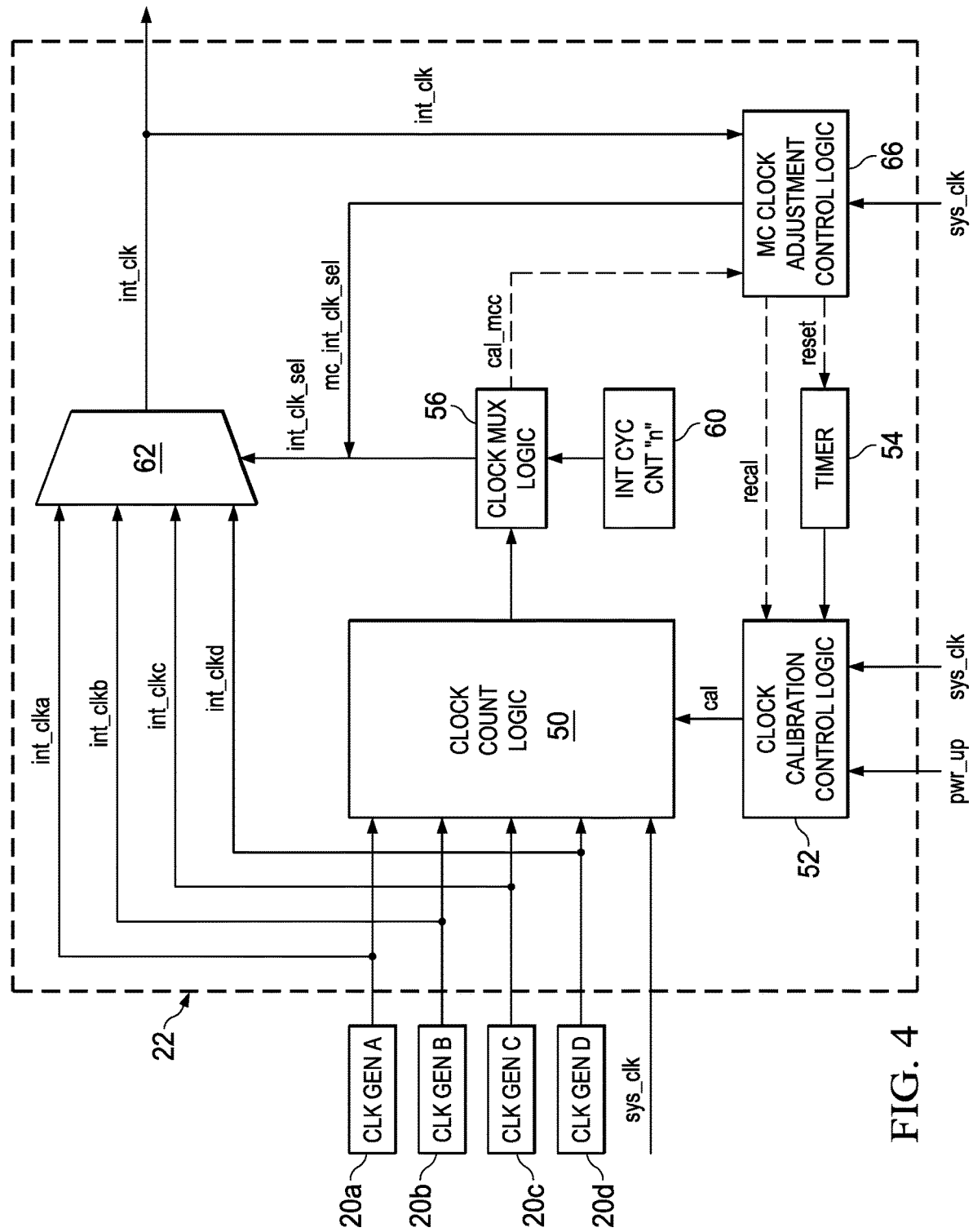
FIG. 4 is a schematic representation of the clock select logic of FIG. 1 in accordance with one embodiment.

FIG. 4 illustrates an example embodiment of clock select logic 22 that is configured to perform both a clock calibration process as well as a mid-cycle adjustment process. Using these processes, clock select logic 22 is able to select the output of one of the clock generator circuits 20a, 20b, 20c, 20d for use as internal clock int_clk in such a manner that the requirements of various functions within device 10 can reliably operate over a wide range of process parameters, and voltage and temperature conditions. For the case of FRAM 14 in device 10, these embodiments enable the reliable selection of internal clock int_clk so as to provide the necessary number of internal clock cycles of at least the minimum necessary internal clock period t_int within the specified maximum memory cycle time t_cyc, over a wide range of process parameters and operating conditions.

In an effort to provide a more organized explanation of the operation of clock select logic 22 of FIG. 4, the following paragraphs of this specification will first describe the clock calibration process that selects from available clock generator circuits a clock signal for use as internal clock int_clk based on current operating conditions. This calibration process may be based on a count of cycles relative to a period of system clock sys_clk and may be performed on device power-up as well as periodically thereafter to account for voltage and/or temperature drift during device operation. The description will then further describe embodiments relating to mid-cycle detection of voltage and/or temperature drifts and the adjustment of internal clock int_clk in response to detecting such mid-cycle events. As used herein, the term "mid-cycle" and the like is understood to mean within a period of a reference clock, such as system clock sys_clk, i.e., at some point between the beginning and end of the system clock period, not necessarily the mid-point of a period from a temporal perspective.

In the example of FIG. 4, clock count logic 50 receives internal clock signals int_clka, int_clkb, int_clkc, int_clkd from clock generator circuits 20a, 20b, 20c, 20d, respectively, and also receives system clock sys_clk. Clock count logic 50 is responsive to a control signal cal supplied by clock calibration control logic 52 to count the number of cycles of each of the clock signals int_clka, int_clkb, int_clkc, int_clkd that occur within a period of system clock sys_clk. Clock calibration control logic 52 receives system clock sys_clk and a power-up signal pwr_up as inputs. In the depicted embodiment, clock select logic 22 also includes timer 54 that issues a signal to clock calibration control logic 52.

Clock count logic 50 may include one or more counters that count cycles of a clock signal. For example, the clock count logic 50 may include a single counter in conjunction with a selection circuit, such a multiplexer, that passes each of the clock signals int_clka, int_clkb, int_clkc, int_clkd to the counter on successive periods of system clock sys_clk. Such an arrangement is disclosed in commonly assigned U.S. Pat. No. 9,350,336, which is hereby incorporated by reference. Alternatively, clock count logic 50 can include multiple counters, such as one for each of the clock signals int_clka, int_clkb, int_clkc, int_clkd, that may be used to count the cycles of the clock signals in parallel, i.e., over the same period of system clock sys_clk.

The output of clock count logic 50, which represents a count of the number of cycles of each of the clock signals int_clka, int_clkb, int_clkc, int_clkd over a period of system clock sys_clk is applied to an input of clock multiplexer logic 56. Clock multiplexer logic 56 also receives the contents of register 60, which stores a value n. As will be described in more detail below, n represents a minimum number of cycles that an internal clock signal is expected to complete within one period of system clock sys_clk in order to satisfy the maximum memory cycle time constraint t_cyc, defined above with reference to FIG. 3. Clock multiplexer logic 56 issues a select signal int_clk_sel that is applied to the control input of multiplexer 62, which also receives internal clock signals int_clka through int_clkd at its inputs. Multiplexer 62 outputs internal clock int_clk corresponding to the one of the internal clock signals int_clka through int_clkd indicated by select signal int_clk_sel from clock multiplexer logic 56.

The operation of clock select logic 22 to perform the aforementioned clock calibration process, according to an embodiment, will now be described with reference to the flow diagram of FIG. 5. The clock calibration process 70 may begin with the power-up of device 10 and may, in some embodiments, be repeated periodically during operation of device 10. According to this embodiment, the power-up of device 10, indicated by step 72, causes control circuitry (e.g., power circuitry 19 shown in FIG. 1) to issue the signal pwr_up to clock calibration control logic 52. Also, as device 10 powers up, clock generator circuits 20a through 20d begin operation at step 74, outputting internal clock signals int_clka through int_clkd at their respective frequencies, given the relevant process parameters of that instance of device 10 and its current operating conditions (power supply voltage Vdd, operating temperature, etc.).

As clock generator circuits 20a through 20d begin operation and in response clock calibration control logic 52 receiving signal pwr_up, process 70 proceeds to step 78 in which the number of cycles of each of internal clock signals int_clka through int_clkd relative to a cycle of the received system clock sys_clk (step 76), are counted by clock count logic 50. A period or cycle of system clock sys_clk may be referred to as "t_sys_clk." The counting process at step 78 may be initiated by clock calibration control logic 52 issuing control signal cal to clock count logic 50. As described above, embodiments of clock count logic 50 may count the cycles of internal clock signals int_clka through int_clkd one by one (e.g., using a single counter in connection with a multiplexer to count the cycles of each clock signal int_clka through int_clkd in succession) or in parallel (e.g., using multiple counters to count the cycles of each clock signal int_clka through int_clkd in parallel, such as within the same period of system clock sys_clk). As will be appreciated, using a single counter approach may provide more efficient use of circuit area, but at the expense of requiring more cycles of system clock sys_clk to elapse before all counts are obtained. For instance, using this approach, four cycles of system clock sys_clk would elapse before the counts of the number of cycles of each of the clock signals int_clka through int_clkd are obtained. If a parallel approach that provides a respective counter for each clock signal int_clka through int_clkd is used, the counts of the number of cycles of each of the clock signals int_clka through int_clkd can be obtained more quickly, i.e., in one cycle of system clock sys_clk, but additional circuit area may be required for multiple counters. Regardless of how the clock cycle count process at step 78 is implemented, the counts of the number of cycles of each clock signal int_clka through int_clkd that occur within a system clock period t_sys_clk, as determined by clock count logic 50, are then forwarded to clock multiplexer logic 56.

In any case, according to this embodiment, counts of cycles of internal clock signals int_clka through int_clkd within one system clock period t_sys_clk are determined at step 78. As discussed above, the frequencies at which clock generator circuits 20a through 20d operate, and thus these cycle counts, vary with the particular process parameters (e.g., transistor gate width, threshold voltage, etc.) in this instance of the device 10 and on its current operating conditions (e.g., power supply voltage, temperature).

Figure 6A:
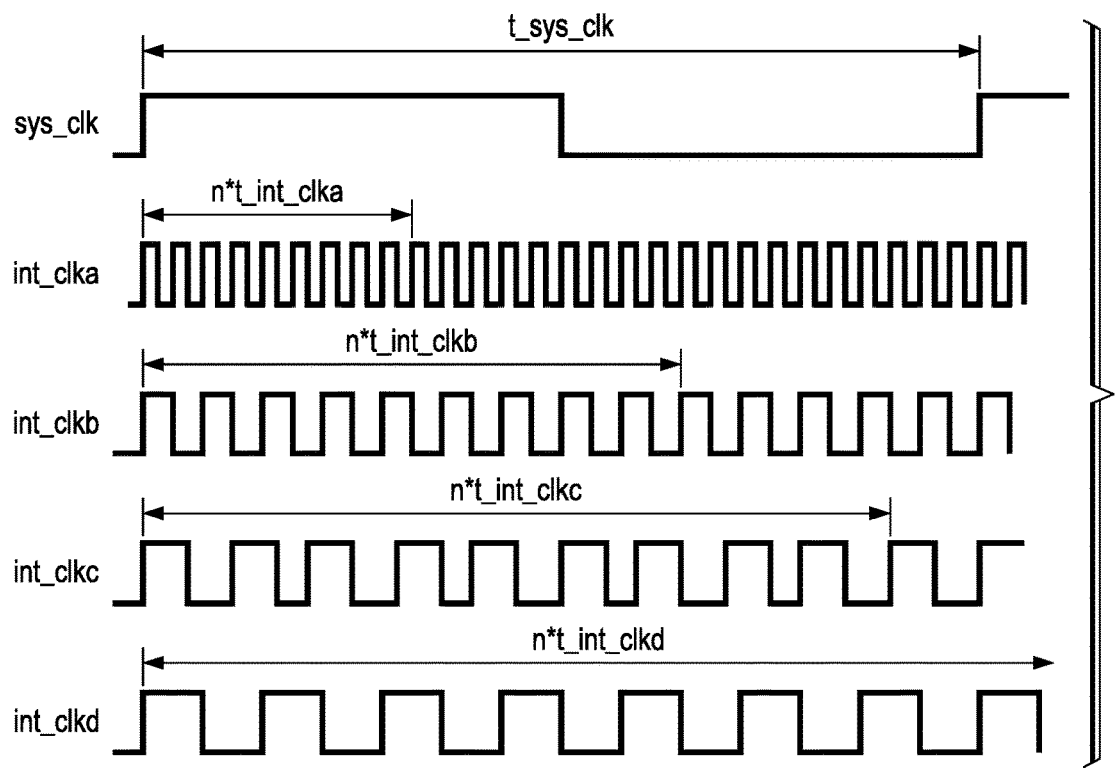
FIGS. 6A and 6B depict a set of internal clock signals with respect to a system clock signal at fast corner and slow corner operating conditions.
Figure 6B:
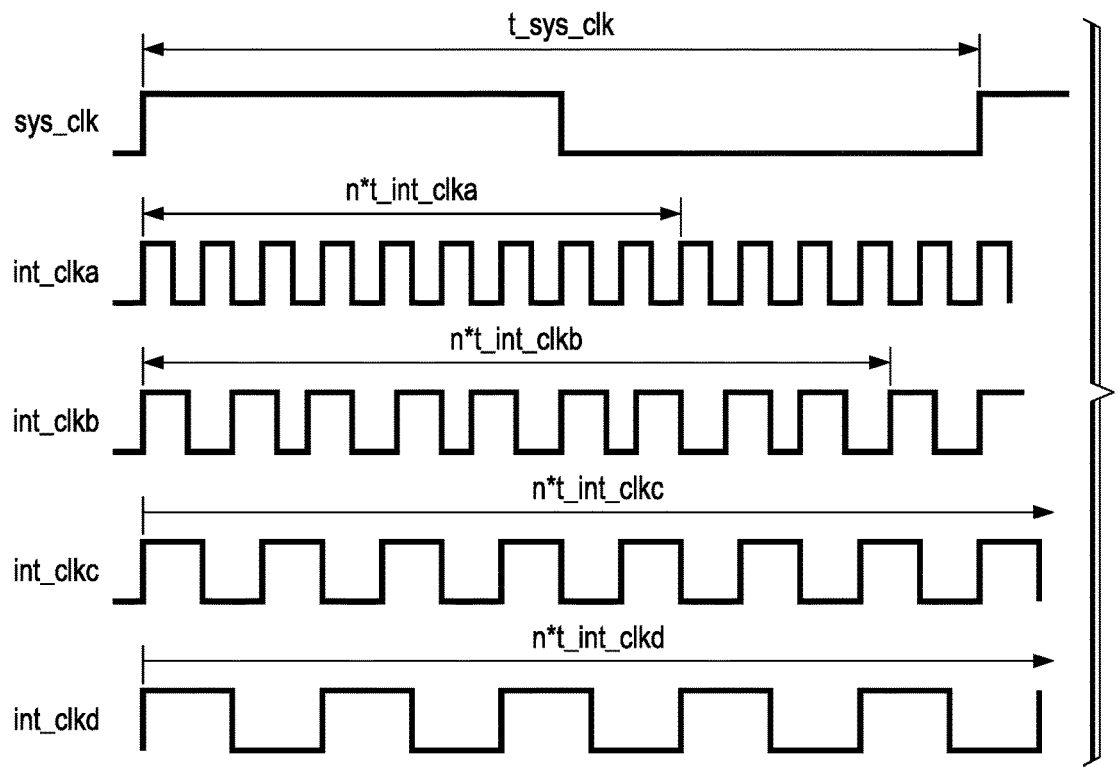

FIGS. 6A and 6B illustrate examples of the variation in frequency of internal clock signals, such as internal clock signals int_clka through int_clkd, relative to a stable clock signal such as system clock sys_clk. In each of FIGS. 6A and 6B, externally-referenced system clock sys_clk is shown as a reference and can be assumed to have a relatively stable period t_sys_clk, as is typical in the art. A comparison of the period of each of internal clock signals int_clka, int_clkb, int_clkc, int_clkd between that shown in FIG. 6A versus that shown in FIG. 6B provides a qualitative indication of the extent of variation observed in modern integrated circuits. As noted above, as large as 100% variation in output frequency has been observed for a given oscillator over expected variations in process parameters and operating conditions.

More specifically, the example of FIG. 6A corresponds to a relatively fast "corner" of process parameters (e.g., narrow gate widths, low threshold voltage) and operating conditions (e.g., high power supply voltage, low temperature), at which the frequencies of internal clock signals int_clka, int_clkb, int_clkd are relatively high. For this fast corner example, within a cycle of system clock sys_clk, twenty-eight cycles of internal clock signal int_clka occur, fourteen cycles of internal clock signal int_clkb occur, ten cycles of internal clock signal int_clkc occur, and seven cycles of internal clock signal int_clkd occur. Conversely, the example of FIG. 6B corresponds to a relatively slow corner of process parameters (e.g., wide gate widths, high threshold voltage) and operating conditions (e.g., low power supply voltage, high temperature), at which the frequencies of internal clock signals int_clka, int_clkb, int_clkd are lower. For this slow corner example, fourteen cycles of internal clock signal int_clka, ten cycles of internal clock signal int_clkb, seven cycles of internal clock signal int_clkc, and four full cycles of internal clock signal int_clkd occur within one system clock period t_sys_clk. Depending on the particular process parameters and current operating conditions of device 10, cycle counts such as these for each of internal clock signals int_clka, int_clkb, int_clkd are obtained by clock count logic 50 and forwarded to clock multiplexer logic 56 at step 78 in FIG. 5.

On receiving the clock cycle counts from clock count logic 50, clock multiplexer logic 56 determines by way of steps 80 and 82 which of internal clock signals int_clka through int_clkd is to be selected as internal clock int_clk. As discussed above, a particular function or operation of one or more components of the device 10, such as FRAM 14, may be reliant on a particular minimum number m of cycles of internal clock int_clk occurring within a particular period. For the example of a read cycle of FRAM 14 discussed above (FIG. 3), these m cycles of internal clock int_clk should occur within a specified maximum memory cycle time t_cyc. The constraint of maximum memory cycle time t_cyc for FRAM 14 can be defined as:

$$m \cdot t\_int\_clk < t\_cyc$$

where t_int_clk represents a period of internal clock int_clk. As discussed above, at step 78, clock count logic 50 counts the number n of cycles of each of internal clock signals int_clka through int_clkd within one system clock period t_sys_clk. For a given one of those internal clock signals int_clka through int_clkd, having a period p, the number n of cycles counted in step 78 can be expressed as:

$$\frac{1}{f_{sys} \cdot p} = n$$

where $f_{sys}$ is the frequency of system clock sys_clk. Accordingly, the minimum cycle count n, which represents the minimum number of cycles of internal clock signals int_clka through int_clkd within one system clock period t_sys_clk that satisfies the maximum memory cycle time constraint t_cyc, can thus be expressed as:

$$n \geq \frac{m}{f_{sys} \cdot t\_cyc}$$

Typically, this number n is identified in the design process of the circuitry (e.g., one or more integrated circuits) of the device 10 and, in the depicted embodiment, is stored in register location 60 accessible by clock multiplexer logic 56, as shown in FIG. 4.

Alternatively, in some embodiments, instead of the memory cycle time constraint t_cyc, the maximum read access time may be used to define the minimum cycle count n. It is contemplated that those skilled in the art having reference to this specification can readily derive the appropriate relationship based on read access time.

Referring again to FIG. 5, at step 80 of process 70, clock multiplexer logic 56 compares the cycle counts obtained for each of internal clock signals int_clka through int_clkd with that number n to identify those of internal clock signals int_clka through int_clkd that have cycle counts equal to or greater than n internal clock int_clk cycles. Any one of those identified internal clock signals int_clka through int_clkd can theoretically serve as internal clock int_clk by providing a sufficient number (at least n) of internal clock cycles to accomplish a given function within the maximum memory cycle time t_cyc.

For example, FIGS. 6A and 6B illustrate which of internal clock signals int_clka through int_clkd produce n cycles within a single cycle of system clock sys_clk for an example case where n=9. At the fast corner of FIG. 6A, each of internal clock signals int_clka, int_clkb, and int_clkc are at a sufficiently high frequency to produce nine or more cycles (as shown by the measure n*t_int_clk) within one system clock period t_sys_clk. Internal clock signal int_clkd completes only seven cycles within a cycle of system clock sys_clk, and as such is not one of the internal clock signals identified in step 80 under these conditions. At the slow corner shown by FIG. 6B, only internal clock signals int_clka and int_clkb are at a sufficiently high frequency to produce nine or more cycles within one system clock period t_sys_clk. Here, internal clock signals int_clkc and int_clkd have fewer than nine cycles within that one period.

However, as is also mentioned above, notwithstanding that internal clock int_clk completes at least n cycles within a system clock period t_sys_clk, it is also desirable that the period of internal clock int_clk be at least as long as some minimum period t_int to help ensure proper operation. Indeed, it may often be desirable for the period of internal clock int_clk to be as long as possible, so long as the maximum memory cycle time t_cyc is met. Stated another way, with reference to the "fast" conditions (process, voltage, and temperature) that FIG. 6A represents, the n=9 cycles of internal clock int_clka consume only about one-third of system clock period t_sys_clk, as the cycle count of internal clock signal int_clka obtained at step 78 is twenty-eight cycles. On the other hand, the n=9 cycles of internal clock int_clkc consume nearly the entirety of system clock period t_sys_clk, as the cycle count of internal clock signal int_clkc obtained at step 78 is ten. Accordingly, the period of internal clock signal int_clkc is longer than that of internal clock signal int_clka, which allows for more robust operation of the internal functions of device 10 while still attaining the n cycles to satisfy the maximum memory cycle time t_cyc. Thus, in process 70, internal clock signal int_clkc from clock generator circuit 20c is selected at step 82 under the operating conditions of FIG. 6A.

Accordingly, step 82 results in clock multiplexer logic 56 selecting, for use as internal clock int_clk, the one of internal clock signals int_clka through int_clkd that provides at least n cycles within one system clock period t_sys_clk, but has the lowest count of cycles among those internal clock signals int_clka through int_clkd identified at step 80 as having at least n cycles within that period t_sys_clk. More generally, the one of internal clock generator circuits 20a through 20d operating at the lowest frequency that produces at least n cycles within a cycle of system clock signal sys_clk is selected for use as internal clock int_clk. As mentioned above, at the fast corner shown in FIG. 6A, step 82 results in selection of internal clock signal int_clkc from clock generator circuit 20c as internal clock int_clk, as it has the fewest number of cycles within system clock period t_sys_clk equal to or greater than the number n when n=9. Similarly, at the slow corner shown in FIG. 6B, step 82 results in selection of internal clock signal int_clkb from clock generator circuit 20b, as it has the fewest number of cycles within system clock period t_sys_clk (i.e., ten cycles) equal to or greater than n. As a result of this determination in step 82, clock multiplexer logic 56 issues the appropriate value of signal int_clk_sel to multiplexer 62 to cause selection of the corresponding one of internal clock signals int_clka through int_clkd for use as internal clock int_clk, which is then used in operation of device 10.

The above description of the operation of clock select logic 22 refers to an initial clock calibration process that is performed on power-up of device 10. However, as previously stated, this calibration process is not limited to use only on power-up. Rather, it is contemplated that the operating conditions experienced by device 10 may change over time, most likely from changes in the operating temperature, although variations in the applied power supply voltage may also occur. Thus, as mentioned above, this calibration process may be repeated periodically during operation. Referring again to FIG. 4, timer 54 is provided within clock select logic 22 to detect the elapse of a selected operating time and to issue a signal to clock calibration control logic 52 in that event. The operating time may, for example, be programmed in a configuration register. It is contemplated that this selected time will typically be design-specific, and may also depend on how rapidly the device environment may change in the intended application.

Figure 5:
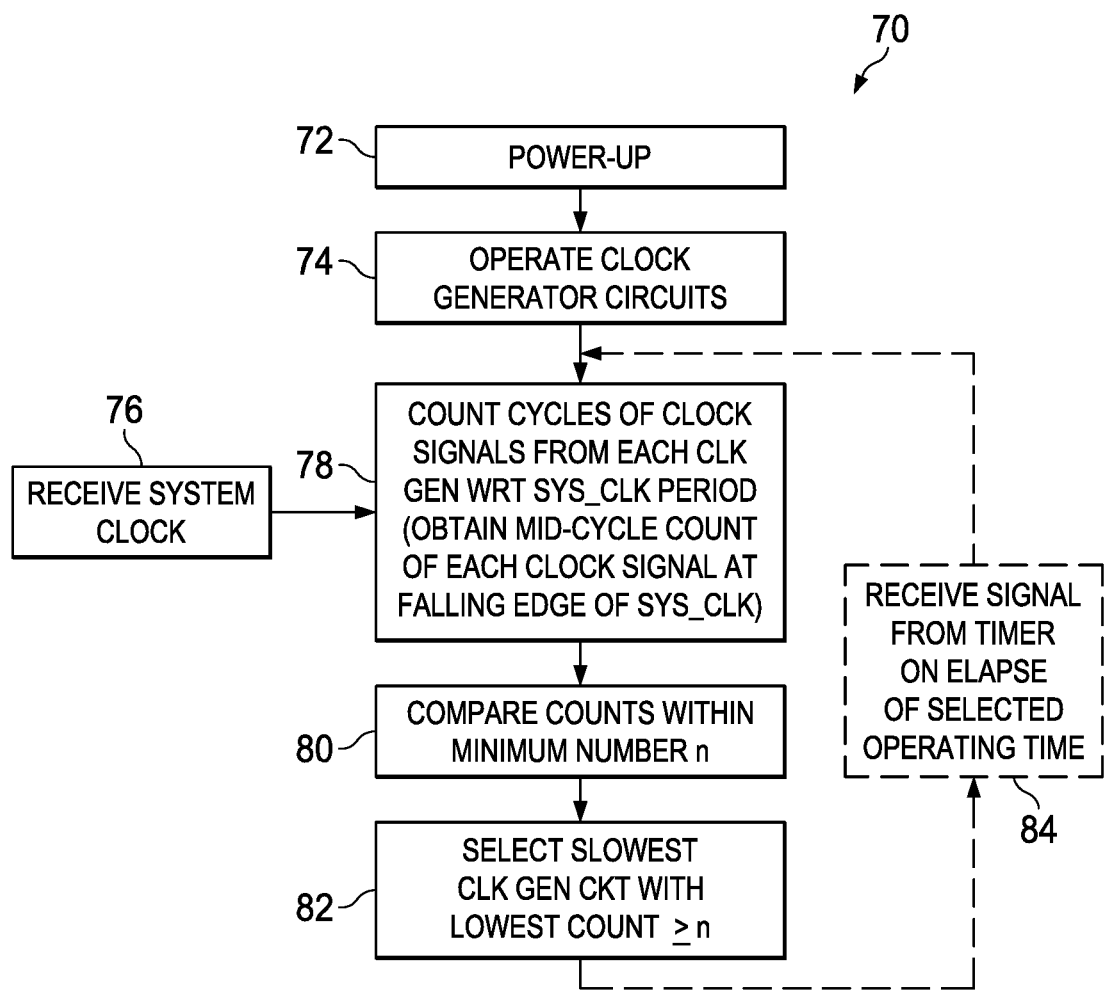
FIG. 5 is a process for calibrating an internal clock signal in accordance with one embodiment.

When the certain operating time has elapsed, as shown by optional step 84 in FIG. 5, clock selection logic 22 can then initiate step 78 again to "recalibrate" internal clock int_clk by counting cycles of internal clock signals int_clka through int_clkd within a system clock period t_sys_clk, and to determine via steps 80, 82 whether operating conditions have changed sufficiently to cause selection of a different one of those internal clock signals int_clka through int_clkd as internal clock int_clk. For instance, let us assume that on the initial calibration, internal clock signal int_clkc was selected as internal clock int_clk due to operating conditions at that time being similar to the fast corner of FIG. 6A. If on recalibration, the operating conditions have changed to be more similar to the slow corner of FIG. 6B, then using internal clock signal int_clkc as internal clock int_clk is no longer suitable since at the slow corner conditions, internal clock signal int_clkc does not attain n cycles within one system clock period t_sys_clk. In this example, carrying out steps 80 and 82 during recalibration will result in selection of internal clock signal int_clkb as internal clock int_clk since it is the slowest of the internal clock signals int_clka through int_clkd that attains n cycles within one system clock period t_sys_clk under such operating conditions. Of course, if operating conditions at a time of recalibration have not changed significantly from the conditions at the initial calibration, then it is possible that internal clock signal int_clkc will be selected again, and thus internal clock int_clk will not change.

In either case, device 10 continues operation based on the internal clock int_clk selected by the recalibration. Timer 54 may then reset and begin a new measurement of the elapsed operating time, with the process continuing. For the case of a device that includes a memory integrated circuit, such as FRAM 14, it is contemplated that this repeated selection of one of those internal clock signals int_clka through int_clkd may be performed in parallel with a memory access time, so that no memory dead time is incurred beyond that required in the initial selection.

In a further embodiment, the frequency relationships between clock generator circuits 20a through 20d may be known. For instance, let us take an example in which clock generator circuit 20b runs at half the frequency of clock generator 20a, clock generator circuit 20c runs at a third of the frequency of clock generator 20a, and clock generator circuit 20d at half the frequency of clock generator 20b. If the frequency relationships among the clock generator circuits 20a through 20d are known, the determination of which of internal clock signals int_clka through int_clkd may be determined from analyzing only one of those signals. For instance, in such an embodiment, the clock count logic 50 could count just the cycles of internal clock signal int_clka over a system clock period t_sys_clk. Based on the known frequency relationships, the number of cycles of the other internal clock signals int_clkb, int_clkc, int_clkd can be derived. Once the number of cycles of each internal clock signals int_clka through int_clkd is known, the selection of which of these signals is to be selected as internal clock int_clk is determined in the same manner discussed above in process 70. In this example, the cycle counts of internal clock signals int_clka through int_clkd may be obtained with just one of the clock generator circuits 20a through 20d (e.g., circuit 20a producing signal int_clka) operating, which can reduce power consumption. Alternatively, all clock generator circuits 20a through 20d may operate but with only one of the produced signals (e.g., signal int_clka) being applied to clock count logic 50.

By periodically performing the clock calibration process described above during operation of device 10, the clock select logic 22 can produce an internal clock signal int_clk with the largest possible period that also completes n cycles within a system clock period t_sys_clk, which advantageously helps to ensure that the device 10 is afforded a sufficient number of cycles and signal margin to complete a given operation. It is, however, conceivable that changes in operating conditions, such as a change in power supply voltage and/or temperature, may affect the current internal clock int_clk in way that it might no longer be able to complete n cycles within a system clock period t_sys_clk. Thus, depending on how frequently the clock calibration process is performed (e.g., depending on the operating time that elapses between each calibration) the current internal clock int_clk may remain in a slowed state (e.g., completing fewer than n cycles in a period of system clock sys_clk) due to the operating condition changes for some time before a calibration is performed again to switch internal clock int_clk to a faster one of internal clock signals int_clka through int_clkd. The time between each calibration (e.g., the selected operating time) may be referred to as a calibration cycle. Moreover, certain conditions may occur during operation in which operating conditions can vary within the same system clock period t_sys_clk. For example, consider a scenario where the supply voltage drops partway through an active memory cycle. This may cause the current internal clock int_clk to slow down within system clock period t_sys_clk and not be able to complete n cycles. As can be appreciated, internal clock int_clk being unable to complete n cycles within a system clock period t_sys_clk is generally undesirable, as device 10 may not be able to complete certain operations.

Accordingly, referring again to FIG. 4, another aspect of clock select logic 22 that addresses operating condition changes that may occur between calibration cycles as well as within a system clock period t_sys_clk is provided by mid-cycle clock adjustment control logic 66. Mid-cycle clock adjustment control logic 66 receives internal clock int_clk produced by multiplexer 62 and system clock sys_clk. As will be explained further below, mid-cycle clock adjustment control logic 66 can detect drifts in operating conditions between calibration cycles or even within a given system clock period t_sys_clk and, in response to detecting such occurrences, cause clock select logic 22 to perform one or more actions to adjust internal clock int_clk accordingly.

In accordance with disclosed embodiments, mid-cycle clock adjustment control logic 66 detects operating condition drifts (e.g., voltage and/or temperature drifts) by monitoring changes in a mid-cycle count of internal clock int_clk. For example, in one embodiment, the mid-cycle count is determined by counting the number of cycles of internal clock int_clk that complete between the beginning of a period of system clock sys_clk indicated by a rising edge to when a falling edge in the same period of system clock sys_clk is detected. For example, using internal clock signal int_clkc in FIG. 6A, the mid-cycle count here is five, since five cycles of internal clock signal int_clkc have completed when the falling edge of system clock sys_clk occurs. In an ideal case, system clock sys_clk may have a duty cycle of approximately 50 percent, meaning that system clock sys_clk has a high logic level for approximately half the period and a low logic level for the remaining half In practice, however, the duty cycle of externally referenced system clock sys_clk may slightly deviate from 50 percent. For example, a duty cycle of 55-45 may mean that the logic high portion of the signal is slightly greater (taking up 55 percent of the period) than the logic low portion. Stated another way, the falling edge at which the mid-cycle count is obtained is not necessarily the mid-point of the system clock period t_sys_clk depending on the duty cycle. Further, it should be understood that while the examples described herein use a falling edge as transition point in a system clock signal for determining mid-cycle counts, other embodiments may use a system clock signal in which each period begins when the signal is low, in which case a transition point may be a rising edge instead.

Figure 7:
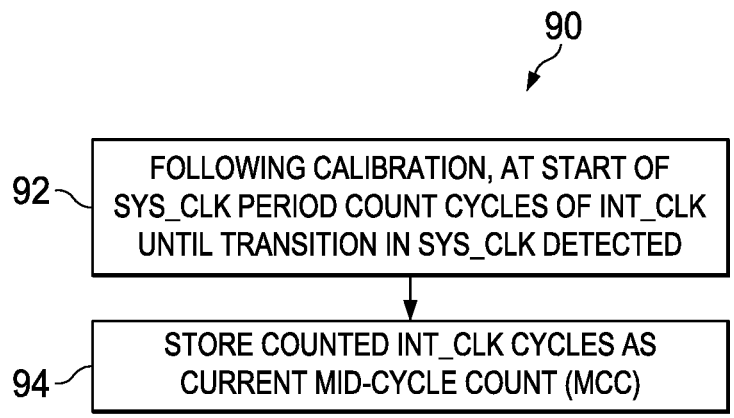
FIG. 7 is a process for obtaining a mid-cycle count of an internal clock signal as part of a mid-cycle clock adjustment process in accordance with one embodiment.

When determined immediately following a calibration procedure (e.g., the next cycle of system clock sys_clk following a selection of internal clock int_clk by clock multiplexer logic 56) the mid-cycle count can be referred to as a calibrated mid-cycle count. FIG. 7 depicts a process 90 that determines a calibrated mid-cycle count value. At step 92, cycles of internal clock int_clk are counted beginning from the start of a system clock cycle t_sys_clk until a transition in system clock sys_clk, such as a falling edge, is detected. At step 94, this mid-cycle count is stored as a calibrated mid-cycle count. For example, the calibrated mid-cycle count may be stored in a register that is part of mid-cycle clock adjustment control logic 56, or separate from but accessible by it (similar to register 60 storing value n). This count is referred to as "calibrated" in the sense that it is based off an internal clock int_clk recently selected as a result of the calibration process 70. In such an embodiment, mid-cycle clock adjustment control logic 66 may include a counter to count cycles of internal clock int_clk as well as circuitry to detect an edge transition in system clock sys_clk. Further, since the mid-cycle count is performed after a calibration in this example, the calibrated mid-cycle count value may not be available for at least one system clock cycle t_sys_clk after calibration.

In another embodiment, rather than wait until after the cycle counts of each of internal clock signals int_clka through int_clkd are obtained by clock count logic 50 and then evaluated by clock multiplexer logic 56, the mid-cycle counts for each of the internal clock signals int_clka through int_clkd relative to a given system clock cycle t_sys_clk are determined by clock count logic 50 during the counting of cycles of each of internal clock signals int_clka through int_clkd over the system clock cycle t_sys_clk. As FIG. 5 shows, step 78 may optionally include obtaining the mid-cycle count of each of internal clock signals int_clka through int_clkd at a falling edge of the system clock signal sys_clk. For example, clock count logic 50 may, for each internal clock signal int_clka through int_clkd, obtain a count of cycles of the signal over the entirety of the system clock cycle t_sys_clk as well a count of cycles corresponding to when a falling edge of system clock signal sys_clk is detected.

Thus, in accordance with such an embodiment, the resulting output of clock count logic 50 that is provided to clock multiplexer logic 56 will include mid-cycle counts (e.g., up to the falling edge of system clock sys_clk) and full cycle counts (e.g., over the entire period of system clock sys_clk) for each internal clock signal int_clka through int_clkd. When clock multiplexer logic 56 makes a selection for internal clock int_clk in steps 80, 82, the mid-cycle count corresponding to the selected internal clock int_clk is provided to mid-cycle clock adjustment control logic 66 as the calibrated mid-cycle count of the currently selected internal clock int_clk, as shown by the dashed line labeled "cal_mcc" in FIG. 4. It will be appreciated that this embodiment may offer some advantages in the sense that the calibrated mid-cycle count is available once the multiplexer 62 outputs the selected one of internal clock signals int_clka through int_clkd as internal clock int_clk, as compared to the embodiment described in FIG. 7 in which the calibrated mid-cycle count is not available for at least one cycle of system clock sys_clk following calibration.

In either case, once the calibrated mid-cycle count is obtained, mid-cycle clock adjustment control logic 66 compares mid-cycle counts of internal clock int_clk in subsequent cycles of system clock sys_clk to monitor for operating condition changes. For example, changes in voltage and or temperature conditions may result in the frequency of the current internal clock int_clk slowing down or speeding up, both of which can be undesirable. For example, in the event internal clock int_clk slows to where it is unable to complete n cycles within system clock period t_sys_clk, this can be problematic as it may result in device 10 being unable to complete a given operation due to insufficient internal clock int_clk cycles. On the other hand, in the event internal clock int_clk speeds up, it may still complete at least n cycles within system clock period t_sys_clk, but the period of each cycle of internal clock int_clk may be reduced, which can affect device operation. As discussed above, it is generally desirable that the period of internal clock int_clk be at least as long as a minimum period t_int to help ensure proper operation.

Figure 8:
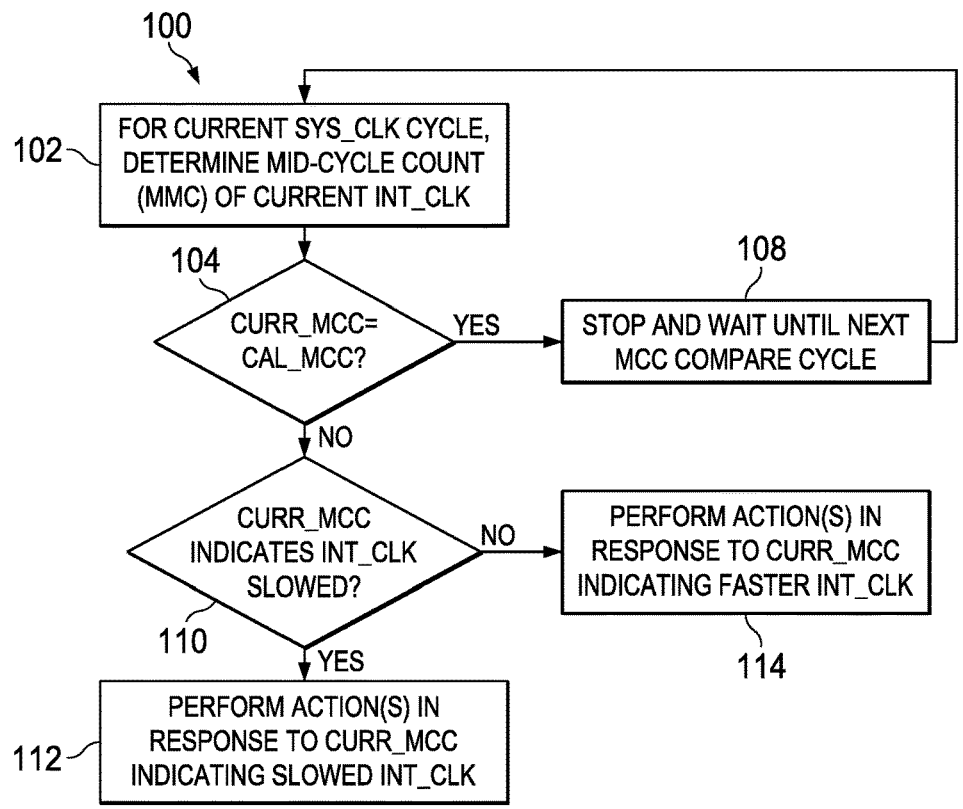
FIG. 8 is a process for performing a mid-cycle adjustment of an internal clock signal in accordance with one embodiment.

Accordingly, mid-cycle clock adjustment control logic 66 may address situations in which the frequency of internal clock int_clk changes (e.g., speeds up or slows down) as a result of operating condition changes occurring between calibration cycles, including changes that may occur within a system clock period t_sys_clk. FIG. 8 shows a process 100 that can be performed using mid-cycle clock adjustment control logic 66 to address such mid-cycle operating condition changes in accordance with one embodiment. Process 100 begins at step 102 where, for a current cycle of system clock sys_clk, a current mid-cycle count (curr_mcc) for the current internal clock int_clk is determined. As discussed above, this mid-cycle count may be determined by counting the number of completed cycles of internal clock int_clk beginning from a rising edge of system clock sys_clk indicating the start of the current cycle to when a falling edge of system clock sys_clk is detected.

The current mid-cycle count is compared to the calibrated mid-cycle count at decision step 104. If decision step 104 determines that the current mid-cycle count is equal to the calibrated mid-cycle count, this indicates that operating conditions either have not changed or have changed by such a small degree that any effect on the frequency of internal clock int_clk is negligible and does not negatively impact device operation. If such a condition is identified at decision step 104, process 100 continues to step 108 and waits until the next mid-cycle count compare cycle to restart. A mid-cycle count compare cycle, as used herein, refers to how frequently process 100 is performed. For instance, process 100 can be performed during each cycle of system clock sys_clk, or periodically during certain system clock sys_clk cycles (e.g., every other cycle, every third cycle, every fourth cycle, every tenth cycle, every hundredth cycle, etc.).

If decision step 104 determines the current mid-cycle count and the calibrated mid-cycle count are not equal, this indicates that operating condition changes, such as changes in voltage and/or temperature, have resulted in a frequency change in internal clock int_clk. Under this condition, process 100 continues to decision step 110 to determine, based on the current mid-cycle count, whether the frequency of internal clock int_clk has increased (sped up) or decreased (slowed down). If decision step 110 determines that a decrease in the frequency of internal clock int_clk has occurred, process 100 continues to step 112. Otherwise, decision step 110 determines the change in the frequency of internal clock int_clk is an increase, and process 100 continues to step 114. As can be appreciated, a current mid-cycle count that is less than the calibrated mid-cycle count indicates that internal clock int_clk has slowed while a current mid-cycle count that is greater than the calibrated mid-cycle count indicates that internal clock int_clk has sped up relative to the operating conditions from the time of the most recent calibration. Step 112 represents actions that may be performed by clock select logic 22 to adjust internal clock int_clk when changes in operating conditions result in a decrease in the frequency of internal clock int_clk, and step 114 represents actions that may be performed by clock select logic 22 to adjust internal clock int_clk when changes in operating conditions result in a decrease in the frequency of internal clock int_clk. As will be discussed in more detail below with reference to FIGS. 9 through 12, different considerations may be taken in adjusting internal clock int_clk depending on whether the internal clock int_clk frequency increases or decreases due to changes in operating conditions.

Figure 9:
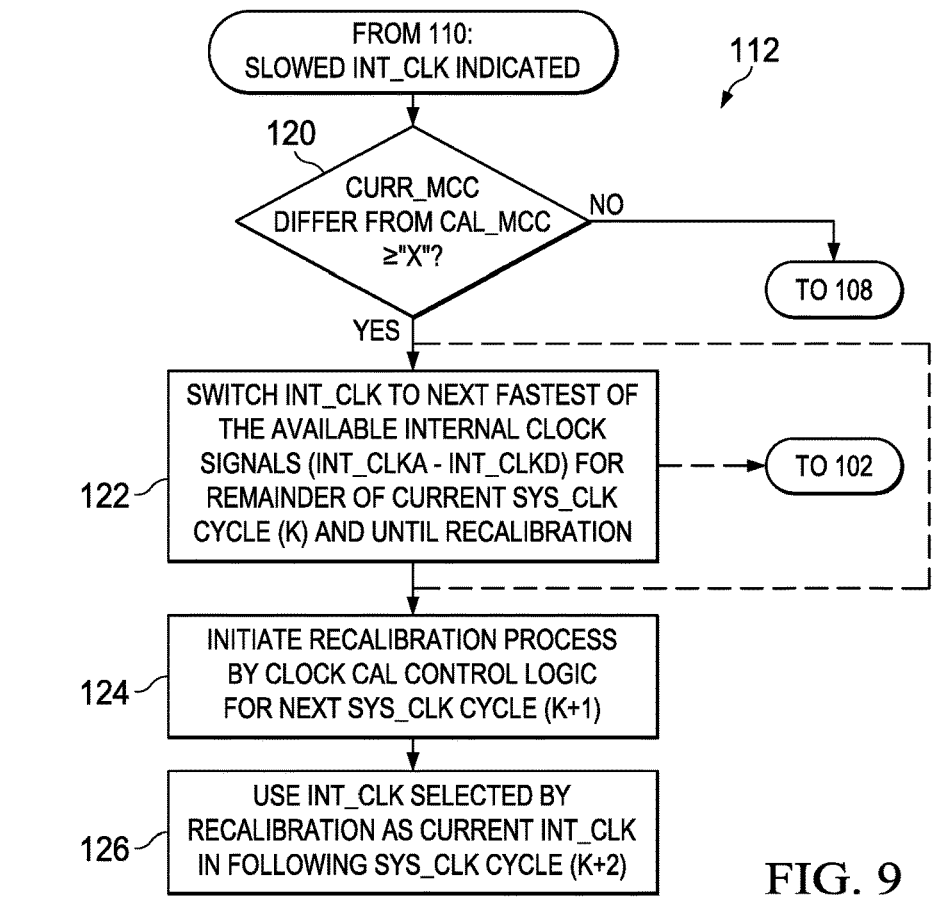
FIG. 9 is a process for adjusting an internal clock signal that that has decreased in frequency during operation in accordance with one embodiment.

FIG. 9 is an example embodiment of a process represented by step 112 of FIG. 8 in which clock select logic 22 adjusts internal clock int_clk in response to a mid-cycle count indicating that the frequency of internal clock int_clk has decreased. Following the determination at decision step 110 that the internal clock int_clk as slowed, process 112 begins with decision step 120 to determine whether the difference between the current mid-cycle count and the calibrated mid-cycle count exceeds a predetermined amount, referred to in FIG. 9 as "x". This predetermined amount provides some degree of tolerance (e.g., a tolerable amount) in determining whether to switch internal clock int_clk to another one of internal clock signals int_clka through int_clkd. Consider an example in which x is selected as two. Here, if the current mid-cycle count and the calibrated mid-cycle count differ by only one cycle, which is less than x, process 112 will not adjust internal clock int_clk. In this case, process 112 may return to step 108 in FIG. 8 to await a restart of process 100. Of course, other values for x can be used in other embodiments.

If decision step 120 determines that the difference between the current mid-cycle count and the calibrated mid-cycle count is greater than or equal to x, process 112 continues to step 122 and internal clock int_clk is switched to the next fastest of the internal clock signals int_clka through int_clkd. This switching of internal clock int_clk may be performed by mid-cycle clock adjustment control logic 66 issuing a mid-cycle internal clock selection signal mc_int_clk_sel to multiplexer 62 having an appropriate value to select the next fastest of the internal clock signals int_clka through int_clkd, as shown in FIG. 4. This switch may occur within the current system clock cycle k, and the selected next fastest internal clock signal becomes the internal clock int_clk for the remainder of system clock cycle k and for subsequent system clock cycles until the next calibration of internal clock int_clk is performed.

In the illustrated embodiment, the switching of internal clock int_clk within the current system clock cycle k at step 122 may also initiate a recalibration of internal clock int_clk by the clock select logic 22 at step 124. For example, concurrent with issuing the signal mc_int_clk_sel to multiplexer 62, mid-cycle clock adjustment control logic 66 may issue a recalibration signal recal to clock calibration logic 52, which may cause clock select logic 50 to carry out steps of process 70 in FIG. 5 (e.g., steps 78, 80, 82) to select internal clock int_clk from internal clock signals int_clka through int_clkd. When signal recal is issued, mid-cycle clock adjustment control logic 66 may also issue a reset signal to timer 54 so that the elapsed count of the operating time is reset. This recalibration may be performed during the system clock cycle k+1 immediately following system clock cycle k. During system clock cycle k+1, the next fastest internal clock signal selected as a result of step 122 may continue to be used as internal clock int_clk. By the start of the next system clock cycle k+2, the result from the recalibration (assuming recalibration takes one system clock cycle in this example) is used as internal clock int clk, as indicated by step 126. As can be appreciated, internal clock int_clk at step 126 may or may not be the same internal clock signal selected at step 122 depending on calibration results and whether operating conditions have changed between system clock cycles k and k+2.

While the present example assumes that the recalibration can be performed in one cycle of system clock sys_clk, it is contemplated that the recalibration may take more cycles of system clock sys_clk in some embodiments, for example in an embodiment in which one counter is used to count multiple internal clock signals on successive periods of system clock sys_clk. In such embodiments, the next fastest internal clock signal that is selected at step 122 may continue to be used as internal clock int_clk until the recalibration process is complete, at which point the clock signal that is selected as a result of the recalibration will be used as internal clock int_clk.

In the example embodiments illustrated by FIG. 9, it is noted that if the current internal clock is already based on the fastest available one of internal clock signals int_clka through int_clkd, then the process 112 may not be able to switch to a faster clock signal. If this condition is encountered at step 122, then process 112 may return to step 108. Additionally, in another embodiment, the switching of the internal clock int_clk does not initiate a recalibration. For instance, the faster internal clock selected in step 122 may be used as internal clock int_clk until the next scheduled calibration is performed in accordance with timer 54, unless additional mid-cycle count compare cycles occurring between system clock cycle k and the next scheduled calibration result in additional changes to internal clock int_clk. In a further embodiment, a difference between the current mid-cycle count and the calibrated mid-cycle count that is greater than or equal to x, as determined at step 120, may cause the process 112 to continue to step 124 without performing step 122. Stated another way, in this embodiment, detecting a sufficient difference between the current mid-cycle count and the calibrated mid-cycle count triggers a recalibration of internal clock int_clk but does not also trigger switching of the internal clock int_clk to a faster clock signal within the cycle k.

Figure 10:
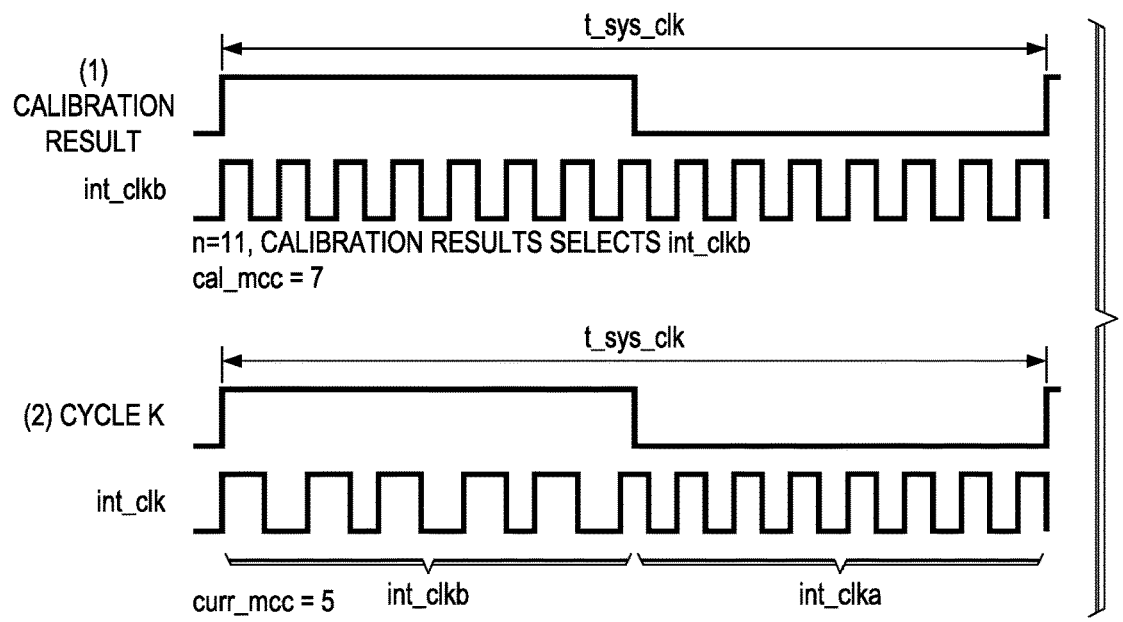
FIG. 10 is an example describing the adjustment of an internal clock in accordance with the process of FIG. 9.

An illustrative example of process 112 is shown in FIG. 10. FIG. 10 illustrates an example scenario in which n is set to 11 and at an initial calibration, operating conditions are similar to the fast corner conditions of FIG. 6A. As a result, internal clock signal int_clkb, which completes 15 cycles within system clock period t_sys_clk, is selected as internal clock int_clk at the initial calibration since it is the slowest one of internal clock signals int_clka through int_clkd that completes at least 11 cycles within one system clock period t_sys_clk. It can be seen here that the signal int_clkb completes 7 cycles by the falling edge of system clock sys_clk under these operating conditions. Thus, the calibrated mid-cycle count (cal_mcc) is 7.

At system clock cycle k occurring at some point after the initial calibration, the frequency of internal clock int_clkb has decreased and is now operating at conditions similar to the slow corner of FIG. 6B. This can be due, for example, to changes experienced by device 10 in supply voltage and/or operating temperature. In FIG. 10, the current mid-cycle count is 5 in cycle k. Using the example above of x=2, since the difference between the calibrated mid-cycle count (7) and the current mid-cycle count (5) is at least x (2), internal clock int_clk is switched to the next fastest of the available internal clock signals, which is signal int_clka in this case. As can be seen here, by switching internal clock int_clk to the signal int_clka for the remainder of system clock cycle k, 13 cycles of internal clock int_clk are completed, thus satisfying n. Had a switch to the signal int_clka not been made, then based on the slow corner conditions, an internal clock based on signal int_clkb would have completed only 10 cycles within system clock cycle k.

In a further embodiment, in response to determining that the difference between the calibrated mid-cycle count and the current mid-cycle count is at least x, instead of switching internal clock int_clk to the next fastest one of internal clock signals int_clka through int_clkd for the remainder of system clock cycle k, step 122 may wait until the next cycle k+1 to perform the switch, using the next fastest clock signal as internal clock int_clk for the duration of cycle k+1, but not during cycle k. If a recalibration is initiated in this embodiment, the recalibration is performed during cycle k+1, followed by using internal clock int_clk as determined by the recalibration at the start of cycle k+2 (again assuming an example in which recalibration takes one cycle of system clock sys_clk).

As those skilled in the art will appreciate, problems relating to an increase in internal clock signal frequency differ somewhat from those relating to a decrease in internal clock signal frequency. For one, assuming that changes in operating conditions cause the internal clock int_clk frequency to increase relative to the frequency of the internal clock int_clk determined at calibration, then at least n cycles will still complete within a system clock period t_sys_clk. However, as the frequency increases, the period of each cycle of internal clock int_clk will decrease. As discussed above, a minimum period t_int in internal clock int_clk can be useful in helping to ensure proper operation of device 10. Accordingly, in some cases, it may be desirable to select a slower clock signal when an increase in frequency of internal clock int_clk is detected. However, careful consideration should be taken, because the switching to a lower frequency clock within a system clock cycle t_sys_clk (e.g., mid-way through a cycle) may result in a scenario where the completion of n cycles is not guaranteed, which can result in device 10 being unable to complete a given operation. Stated another way, in some applications, the completion of n cycles by internal clock signal int_clk within a system clock period t_sys_clk may have greater importance than maintaining a period of t_int in internal clock signal int_clk.

One embodiment for handling detected increases in internal clock int_clk frequency is to simply take no action. Thus, whatever internal clock int_clk is currently selected will continue to be used at least until a scheduled calibration occurs (e.g., per timer 54) or mid-cycle clock adjustment control logic 66 selects a different one of internal clock signals int_clka through int_clkd in response to later detecting a decrease in internal clock int_clk frequency (e.g., issuing signal mc int_clk_sel to select another clock signal).

Figure 11:
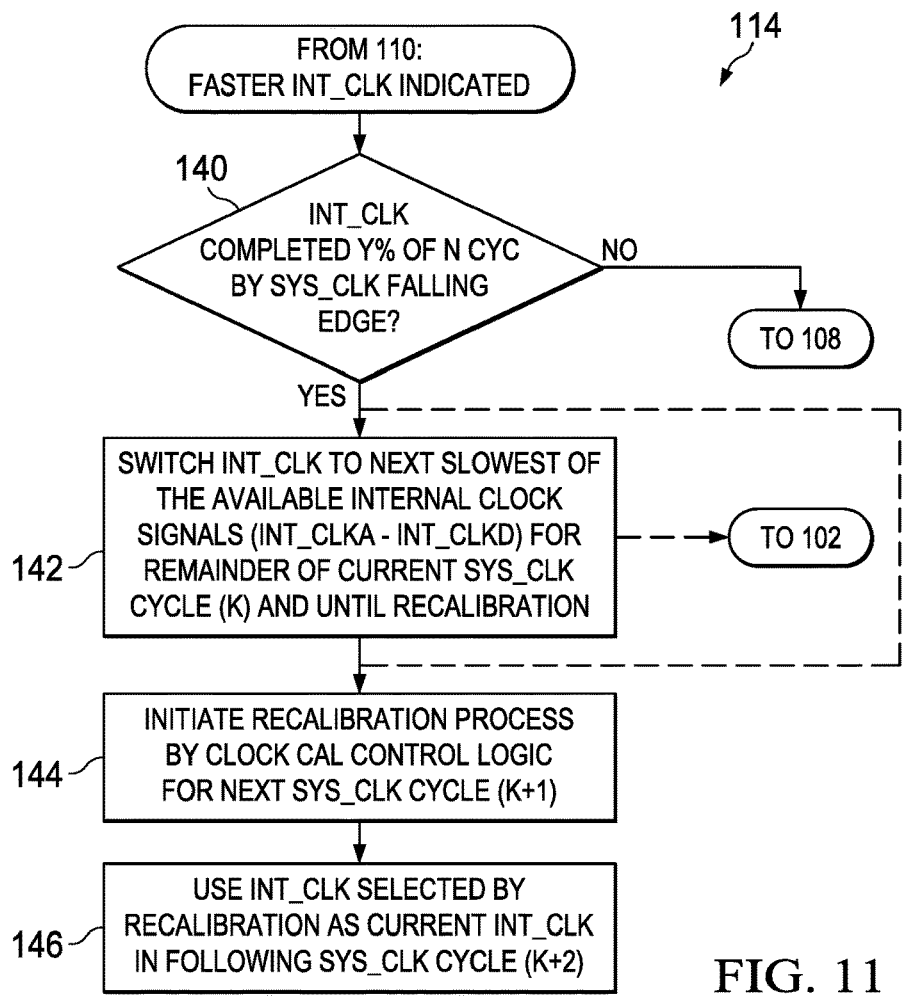
FIG. 11 is a process for adjusting an internal clock signal that has increased in frequency during operation in accordance with one embodiment.

Other embodiments for handling detected increases in internal clock int_clk frequency can result in selecting a slower one of internal clock signals int_clka through int_clkd. Referring back to FIG. 8, when the frequency of internal clock int_clk is determined to have increased, decision step 110 continues to step 114. FIG. 11 is an example embodiment of a process represented by step 114 of FIG. 8 in which clock select logic 22 may adjust internal clock int_clk in response to a mid-cycle count indicating that the frequency of internal clock int_clk has increased. Following the determination at decision step 110 that the internal clock int_clk as sped up, process 114 begins with decision step 140 to determine whether at least a predetermined percentage "y" of the expected cycles n of internal clock int_clk have completed by the time the falling edge of system clock sys_clk occurs. For example, y can be set to a value greater than 50 percent, such as 66 percent or greater, in order to help ensure that a majority of the n cycles have occurred by the falling edge of system clock sys_clk. A tolerable amount of a difference when the internal clock int_clk has sped up is thus based on the percentage y. Since it is difficult to know with certainty whether switching to the next slowest of clock signals int_clka through int_clkd will still result in n cycles, higher values used for y increases the likelihood that n cycles will complete even after switching mid-cycle to a slower clock signal. If decision step 140 determines that at least y percent of n cycles have not occurred by the falling edge of system clock sys_clk, process 114 may return to step 108 in FIG. 8 to await a restart of process 100.

If decision step 140 determines that at least y percent of n cycles have occurred by the falling edge of system clock sys_clk, process 114 continues to step 142 and internal clock int_clk is switched to the next slowest of the internal clock signals int_clka through int_clkd. This switching of internal clock int_clk may be performed by mid-cycle clock adjustment control logic 66 issuing a mid-cycle internal clock selection signal mc int_clk_sel to multiplexer 62 having an appropriate value to select the next slowest of the internal clock signals int_clka through int_clkd, as shown in FIG. 4. This switch may occur within the current system clock cycle k, and the selected next slowest internal clock signal is used as internal clock int_clk for the remainder of system clock cycle k and for subsequent system clock cycles until the next calibration of internal clock int_clk is performed.

In the illustrated embodiment, the switching of internal clock int_clk within the current system clock cycle k at step 142 may also initiate a recalibration of internal clock int_clk by the clock select logic 22 at step 144 in a manner similar to steps 124, 126 of FIG. 9. For example, concurrent with issuing the signal mc int_clk_sel to multiplexer 62, mid-cycle clock adjustment control logic 66 may issue a recalibration signal recal to clock calibration logic 52, which may cause clock select logic 22 to carry out steps of process 70 in FIG. 5 (e.g., steps 78, 80, 82) to select internal clock int_clk from internal clock signals int_clka through int_clkd. As stated above, when signal recal is issued, mid-cycle clock adjustment control logic 66 may also issue a reset signal to timer 54 so that the elapsed count of the operating time is reset. This recalibration may be performed during the system clock cycle k+1 immediately following system clock cycle k. During system clock cycle k+1, the next slowest internal clock signal selected as a result of step 142 may continue to be used as internal clock int_clk. By the start of the next system clock cycle k+2, the result from the recalibration (assuming recalibration takes one system clock cycle in this example) is used as internal clock int_clk, as indicated by step 146. As can be appreciated, internal clock int_clk at step 146 may or may not be the same internal clock signal selected at step 142 depending on the calibration results and whether operating conditions have changed between system clock cycles k and k+2.

Again, while the present example assumes that the recalibration can be performed in one cycle of system clock sys_clk, it is contemplated that the recalibration may take more cycles of system clock sys_clk in some embodiments, for example in an embodiment in which one counter is used to count multiple internal clock signals on successive periods of system clock sys_clk. In such embodiments, the internal clock signal that is selected at step 142 may continue to be used until the recalibration process is complete, at which point the clock signal that is selected as a result of the recalibration will be used as internal clock int_clk.

Figure 12:
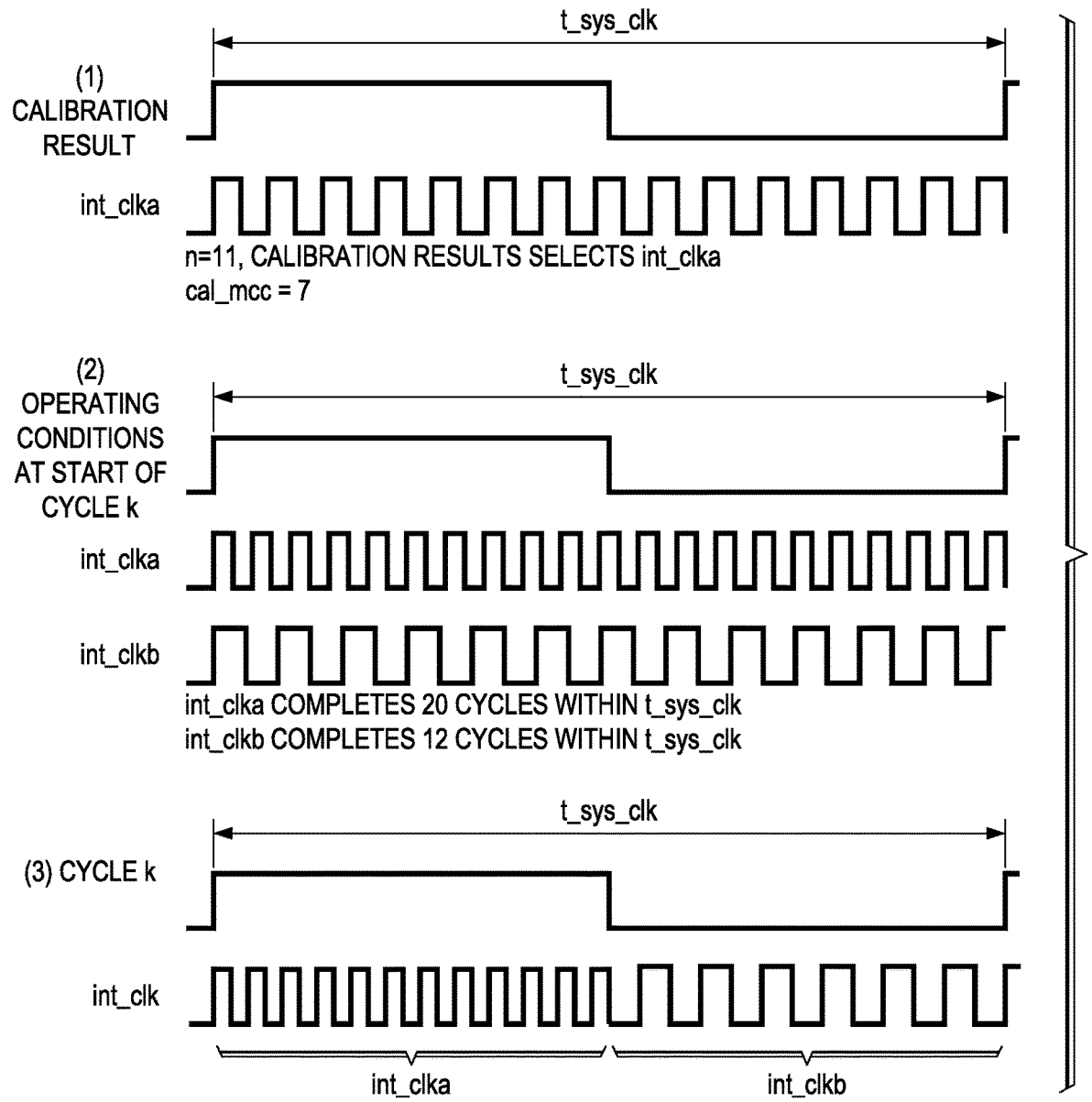
FIG. 12 is an example describing the adjustment of an internal clock in accordance with the process of FIG. 11.

In the example embodiments illustrated by FIG. 11, it is noted that if the current internal clock is already based on the slowest available one of internal clock signals int_clka through int_clkd, then the process 114 may not be able to switch to a slower clock signal. If this condition is encountered at step 142, then process 114 may return to step 108. Additionally, in another embodiment, the switching of the internal clock int_clk does not initiate a recalibration. For instance, the slower internal clock selected in step 142 may be used as internal clock int_clk until the next scheduled calibration is performed in accordance with timer 54, unless additional mid-cycle count compare cycles occurring between system clock cycle k and the next scheduled calibration result in additional changes to internal clock int_clk. In a further embodiment, when decision step 140 determines that at least y percent of n cycles have occurred by the falling edge of system clock sys_clk, process 114 may continue to step 144 without performing step 142. Stated another way, in this embodiment, detecting that at least y percent of n cycles have occurred by the falling edge of system clock sys_clk triggers a recalibration of internal clock int_clk but does not also trigger a switch of the internal clock int_clk to a slower clock signal within the cycle k. In still a further embodiment, the switching of the internal clock int_clk to the next fastest or slowest clock in response to detecting a difference or more than the tolerable amount between the current mid-cycle count and the calibrated mid-cycle count may occur a some number of cycles (e.g., 1, 2, 3, 4, 5, 6, 7, 8, or more cycles) after a current system clock cycle k, as opposed to within system clock cycle k as depicted in the examples of FIGS. 10 and 12. This may be dependent, for example, on system clock cycle frequency and/or internal clock int_clk frequency.

An illustrative example of process 114 is shown in FIG. 12. FIG. 12 illustrates an example scenario in which n is set to 11 and at an initial calibration, operating conditions are similar to the slow corner conditions of FIG. 6B. As a result, internal clock signal int_clka, which completes 14 cycles within system clock period t_sys_clk, is selected as internal clock int_clk at the initial calibration since it is the slowest of internal clock signals int_clka through int_clkd that completes at least 11 cycles within one system clock period t_sys_clk. For instance, as FIG. 6B shows, the next slowest clock signal int_clkb completes only 10 cycles per system clock period t_sys_clk under these slow corner conditions. A calibrated mid-cycle count based on internal clock signal int_clka is 7 under these conditions.

FIG. 12 also shows operating conditions at the start of system clock cycle k. Here, a change in operating conditions, such as a change in supply voltage and/or operating temperature experienced by device 10, has caused the frequency of the internal clock signals to increase. For example, the conditions at cycle k may be somewhere between the fast corner and slow corner conditions depicted by FIGS. 6A and 6B. For example, where signal int_clka and int_clkb are operating at frequencies that produce 14 and 10 cycles, respectively, under the slow corner conditions, they operate at frequencies that produce 20 and 12 cycles, respectively, under the operating conditions at the start of system clock cycle k.

With respect to internal clock int_clk based on signal int_clka, the mid-cycle count in system clock cycle k is 10 (i.e., almost all of the n cycles have completed by this point). For sake of example, let us assume that y is set to a value of 75 percent. Thus, when n=11, y percent of n is 8.25, or 8 when rounded to the nearest whole number. Alternatively, the process 114 can round this value up to the nearest whole number (e.g., to 9). In either case, since the mid-cycle count of int_clka is 10 in cycle k, the condition that at least y percent of n cycles have completed at the falling edge of system clock sys_clk is met, and a switch to the next slowest of the internal clock signals, which is signal int_clkb in this case, is made within the system clock cycle k. As shown, adjusting internal clock int_clk to be based on internal clock signal int_clkb will complete 6 more cycles during the remainder of system clock cycle k. In either case, n=11 is satisfied.

As will be appreciated, the assumption here is that if 75 percent of the n cycles have completed by the falling edge of system clock sys_clk, which is ideally, though not always, at approximately the mid-point of the period t_sys_clk depending on the duty cycle of system clock sys_clk, then the probability that the remaining 25 percent of the n cycles will be completed even when switching to the next slowest of the internal clocks int_clka through int_clkd is more likely than not. In this example, since 10 cycles of internal clock int_clk have completed at the falling edge of system clock sys_clk in cycle k, then only one more cycle needs to complete during the remainder of cycle k to satisfy n=11 cycles.

In a further embodiment, in response to determining that at least y percent of n cycles have completed at the falling edge of system clock sys_clk, instead of switching internal clock int_clk to the next slowest one of internal clock signals int_clka through int_clkd for the remainder of system clock cycle k, step 142 may wait until the next cycle k+1 to perform the switching, using the next slowest clock signal as internal clock int_clk for the duration of cycle k+1. If a recalibration is initiated in this embodiment, the recalibration can be performed during cycle k+1, followed by using internal clock int_clk as determined by the recalibration at the start of cycle k+2 (again, assuming an example where the recalibration takes one cycle of system clock sys_clk).

Figure 13:
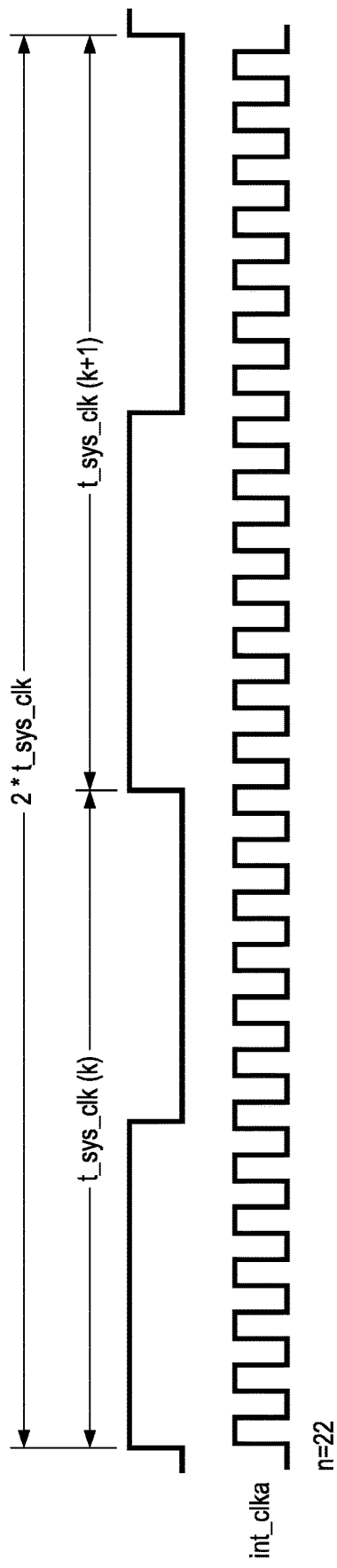
FIG. 13 is an example depicting a mid-cycle count that is based on more than one period of a system clock signal in accordance with disclosed embodiments.

While the above-described example embodiments have based a mid-cycle count on one cycle of the system clock sys_clk, it will be appreciated that the mid-cycle count may be based on multiple consecutive cycles of system clock sys_clk in some embodiments. FIG. 13 is an example in which a mid-cycle count is determined based on two consecutive cycles (referred to as k and k+1) of system clock sys_clk. In this example, the minimum number of cycles n that a sufficiently fast internal clock signal is expected to produce is 22 cycles over a time period equal to two cycles of system clock sys_clk (2*t_sys_clk). The point within this time period at which a mid-cycle count is determined is where cycle k ends and cycle k+1 begins. Based on these example parameters, the mid-cycle count for the internal clock int_clka under current operating conditions is 12 cycles. In other embodiments, greater than two cycles of system clock sys_clk may also be used to determine a mid-cycle count. For instance, when the mid-cycle count is determined based on three consecutive cycles of system clock sys_clk (e.g., cycle k, k+1, and k+2), the point at which the mid-cycle count is determined may be when a state transition occurs in the second (cycle k+1) of the three cycles of system clock sys_clk. When the mid-cycle count is determined based on four consecutive cycles of system clock sys_clk (e.g., cycle k, k+1, k+2, and k+3), the point at which the mid-cycle count is determined may be where cycle k+1 ends and cycle k+2 begins. Those skilled in the art will appreciate that any number of cycles of system clock sys_clk may be used and mid-cycle counts of the internal clock signal int_clk may be determined based on the techniques described herein.

Figure 14:
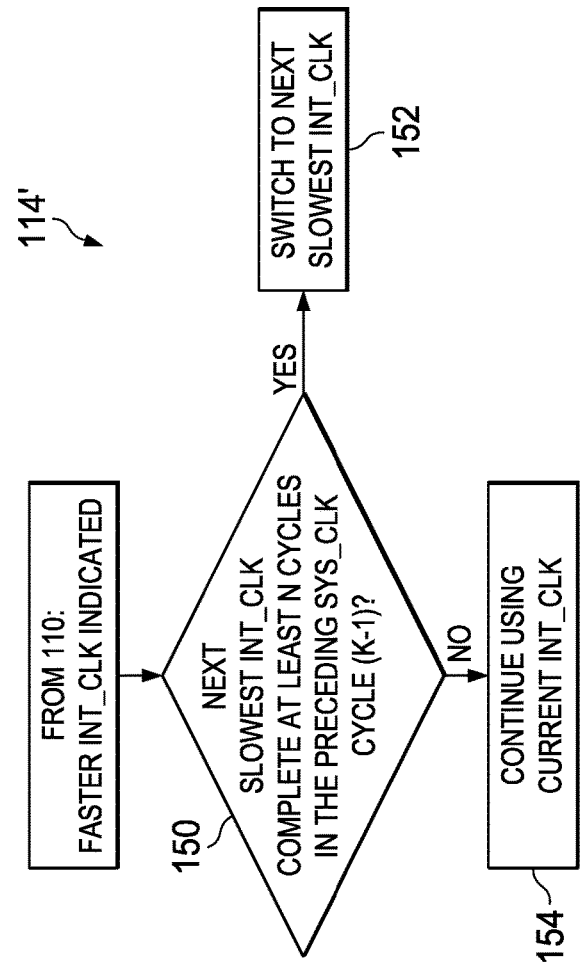
FIG. 14 is a process for adjusting an internal clock signal that has increased in frequency during operation in accordance with another embodiment.

FIG. 14 is another example embodiment of a process represented by step 114 of FIG. 8 in which clock select logic 22 may adjust internal clock int_clk in response to a mid-cycle count indicting that the frequency of internal clock int_clk has increased. To differentiate FIG. 14 from the embodiment described in FIG. 11, reference number 114' is used instead of 114. In this embodiment, the initial calibration process may, along with selecting internal int_clk from the internal clock signals int_clka to int_clkd, additionally identify the next slowest of the internal clock signals int_clka to int_clkd. For instance, referring to the signals shown in FIG. 6A, if signal int_clkb is selected as the internal clock int_clk, then signal int_clkc is identified as the next slowest of the internal clock signals. During operation, clock count logic 50 may count the number of cycles that signal int_clkc completes within each cycle of the system clock sys_clk (or multiple cycles of the system clock sys_clk as described in FIG. 13). Therefore, when the frequency of internal clock int_clk is determined to have increased, it is known how many cycles the next slowest internal clock signal completed during the previous cycle of system clock sys_clk.

Thus, in process 114', once there is an indication that the frequency of internal clock int_clk has increased, a determination is made at decision step 150 as to whether the next slowest internal clock signal completed at least n cycles in the preceding cycle of system clock sys_clk. If the next slowest internal clock signal did complete at least n cycles in the previous cycle of system clock sys_clk, then the internal clock int_clk is switched to the next slowest internal clock signal at step 152. For instance, using the example above, the internal clock int_clk would be switched from int_clkb to int_clkc. Because int_clkc is known to have completed at least n cycles during the preceding period of system clock sys_clk, switching to this slower clock signal still ensures that at least n cycles are met within a cycle of system clock sys_clk. Like the previous examples described, this switch may occur within the current system clock cycle k or some number of cycles later.

If decision step 150 determines that the next slowest internal clock signal completed less than n cycles during the preceding cycle of system clock sys_clk, operation continues using the current internal clock int_clk, as indicated at step 154. In this situation, switching to the next slowest internal clock signal is not desirable, since based on its behavior in the preceding cycle of system clock sys_clk, it likely will not be able to produce n cycles in the current cycle of system clock sys_clk. Thus, while the current internal clock int_clk has sped up, it is preferable to continue using this clock signal rather than switch to the next slowest clock signal that does not produce at least n cycles in a cycle of system clock sys_clk under the current operating conditions.

Further, it will also be appreciated that decision step 150 may take into account whether the frequency of the current internal clock int_clk has changed by more than a tolerable amount. This may be implemented similar to FIG. 9, in which it is determined whether the current mid-cycle count differs (e.g., is greater than) the calibrated mid-cycle count by more than a certain number of clock cycles (e.g., 2 or more cycles). It may also be implemented based on whether the current internal clock int_clk completes at least a certain percentage of n cycles by the point at which the mid-cycle count is determined, similar to FIG. 11.

As will be understood, the various techniques described above and relating the generation of internal clock signals within integrated circuit devices are provided herein by way of example only. Accordingly, it should be understood that the present disclosure should not be construed as being limited to only the examples provided above. Further, it will be understood by those having ordinary skill in the art that the various techniques described herein relating to the generation, monitoring, and adjustment of internal clock signals may be implemented in any suitable manner, including hardware (suitably configured circuitry), software (e.g., via a computer program including executable code stored on one or more tangible computer readable medium), or via using a combination of both hardware and software elements.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A system comprising,
    a processor;
    a memory device communicatively coupled to the processor;
    clock select logic for providing an internal clock signal to the memory device, wherein the clock select logic comprises:
        inputs for receiving a system clock signal and a plurality of clock signals, each of the plurality of clock signals having a different frequency;
        a selection circuit for receiving the plurality of clock signals and outputting a first clock signal of the plurality of clock signals as the internal clock signal; and
        clock adjustment control logic for counting a number of clock cycles of the internal clock signal relative to a period of time equal to x cycles of a system clock signal, wherein x is an integer greater than or equal to 1, to determine a current mid-cycle count for the internal clock signal, comparing the current mid-cycle count to a calibrated mid-cycle count, and applying a control signal that causes the selection circuit to output a second clock signal of the plurality of clock signals as the internal clock signal when the comparison indicates that the current mid-cycle count differs from the calibrated mid-cycle count by more than a tolerable amount.

2. The system of claim 1, wherein, when the comparison indicates that the current mid-cycle count is less than the calibrated mid-cycle count, the tolerable amount is a first number of clock cycles and the second clock signal is the next fastest of the plurality of clock signals relative to the first clock signal.

3. The system of claim 2, wherein the first number of clock cycles is at least two clock cycles.

4. The system of claim 1, wherein, when the comparison indicates that the current mid-cycle count is greater than the calibrated mid-cycle count, the tolerable amount is based on whether the current mid-cycle count is at least a predetermined percentage of a second number of clock cycles, and the second clock signal is the next slowest of the plurality of clock signals relative to the first clock signal.

5. The system of claim 4, wherein the second number of clock cycles corresponds to a number of clock cycles within the period of time equal to x cycles of the system clock signal that allows for completion of a memory access operation within a maximum memory cycle time constraint.

6. The system of claim 4, wherein the predetermined percentage is at least 66 percent.

7. The system of claim 1, wherein, when the comparison indicates that the current mid-cycle count is equal to the calibrated mid-cycle count or does not differ from the calibrated mid-cycle count by more than the tolerable amount, the first clock signal continues to be used as the internal clock signal.

8. The system of claim 1, wherein x is equal to 1 and the current mid-cycle count is determined by the clock adjustment control logic by counting the number of clock cycles of the internal clock signal that have competed beginning from the start of the current period of the system clock signal to when a state transition in the system clock signal occurs.

9. The system of claim 1, wherein the memory device comprises a ferroelectric random access memory (FRAM) device.

10. An integrated circuit comprising:
    clock generator configured to generate a plurality of clock signals each having a different frequency;
    a selection circuit configured to receive the plurality of clock signals and output a first clock signal of the plurality of clock signals as an internal clock signal; and clock adjustment circuitry configured to:
    count a number of clock cycles of the internal clock signal relative to a current period of a system clock signal to determine a current mid-cycle count for the internal clock signal;
    compare the current mid-cycle count to a calibrated mid-cycle count; and
    apply a control signal that causes the selection circuit to output a second clock signal of the plurality of clock signals as the internal clock signal when the current mid-cycle count differs from the calibrated mid-cycle count by more than a tolerable amount.

11. The integrated circuit of claim 10, wherein the clock adjustment circuitry is configured to determine the current mid-cycle count by counting the number of clock cycles of the internal clock signal that have completed beginning from the start of the current period of the system clock signal to when a state transition of the system clock signal occurs.

12. The integrated circuit of claim 10, wherein the control signal that causes the selection circuit to output the second clock signal as the internal clock signal is applied before the end of the current period of the system clock signal.

13. The integrated circuit of claim 10, comprising a timer, wherein a first clock signal is selected as the internal clock signal as a result of the clock calibration circuitry performing a clock calibration process prior to the current period of the system clock signal, and wherein the clock calibration circuitry is configured to periodically repeat the clock calibration process when the timer indicates that a predetermined operating time has elapsed.

14. The integrated circuit of claim 13, wherein the clock calibration process is performed by counting a number of clock cycles of each of the plurality of clock signals relative to a period of the system clock signal and, based on the counted number of clock cycles of each of the plurality of clock signals, applying a control signal that causes the selection circuit to output the one of the plurality of clock signals having the lowest frequency that also produces at least a first number of clock cycles within a period of the system clock signal as the internal clock signal.

15. The integrated circuit of claim 13, wherein, when the control signal that causes the selection circuit to output the second clock signal as the internal clock signal is applied, the clock adjustment circuitry resets the timer.

16. The integrated circuit of claim 10, wherein, when the current mid-cycle count is less than the calibrated mid-cycle count, the tolerable amount is a second number of clock cycles and the second clock signal is the next fastest of the plurality of clock signals relative to the first clock signal.

17. The integrated circuit of claim 10, wherein, when the current mid-cycle count is greater than the calibrated mid-cycle count, the tolerable amount is based on whether the current mid-cycle count is at least a predetermined percentage of a third number of clock cycles, and the second clock signal is the next slowest of the plurality of clock signals relative to the first clock signal.

18. The integrated circuit of claim 10, comprising wherein the memory device having a ferroelectric random access memory (FRAM) array.

19. A method comprising:
counting a number of clock cycles of an internal clock signal relative to a period of time equal to x periods of a system clock signal to determine a current mid-cycle count for the internal clock signal, wherein the internal clock signal is based on a first clock signal of a plurality of clock signals, each of the plurality of clock signals having a different frequency, and wherein x is an integer greater than or equal to 1;
comparing the current mid-cycle count to a calibrated mid-cycle count; and
when the current mid-cycle count differs from the calibrated mid-cycle count by more than a tolerable amount, selecting a second clock signal of the plurality of clock signals and using the second clock signal as the internal clock signal.

20. The method of claim 19, wherein x is equal to 1 and the current mid-cycle count is determined by counting the number of clock cycles of the internal clock signal that have completed beginning from the start of the current period of the system clock signal to when a state transition of the system clock signal occurs.

21. The method of claim 20, wherein the state transition is a falling edge of the system clock signal.

22. The method of claim 19, wherein, when the current mid-cycle count is less than the calibrated mid-cycle count, the tolerable amount is a first number of clock cycles and the second clock signal is the next fastest of the plurality of clock signals relative to the first clock signal.

23. The method of claim 22, wherein the first number of clock cycles is at least two clock cycles.

24. The method of claim 19, wherein, when the current mid-cycle count is greater than the calibrated mid-cycle count, the tolerable amount is based on whether the current mid-cycle count is at least a predetermined percentage of a second number of clock cycles, and the second clock signal is the next slowest of the plurality of clock signals relative to the first clock signal.

25. The method of claim 24, wherein the second number of clock cycles corresponds to a number of clock cycles within a period of the system clock signal that allows for completion of a memory access operation within a maximum memory cycle time constraint.

* * * * *